(12) United States Patent
Yogo et al.

(10) Patent No.: US 10,584,987 B2
(45) Date of Patent: Mar. 10, 2020

(54) PHYSICAL QUANTITY DETECTION DEVICE

(71) Applicant: Hitachi Automotive Systems, Ltd., Hitachinaka-shi, Ibaraki (JP)

(72) Inventors: Takayuki Yogo, Hitachinaka (JP); Hiroyuki Abe, Hitachinaka (JP); Hiroaki Hoshika, Hitachinaka (JP); Takahiro Miki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 140 days.

(21) Appl. No.: 15/740,452

(22) PCT Filed: Aug. 3, 2016

(86) PCT No.: PCT/JP2016/072710
§ 371 (c)(1),
(2) Date: Dec. 28, 2017

(87) PCT Pub. No.: WO2017/056694
PCT Pub. Date: Apr. 6, 2017

(65) Prior Publication Data
US 2018/0188084 A1 Jul. 5, 2018

(30) Foreign Application Priority Data
Sep. 30, 2015 (JP) ................. 2015-192511

(51) Int. Cl.
*G01F 1/00* (2006.01)
*G01F 1/684* (2006.01)
*F02M 35/10* (2006.01)

(52) U.S. Cl.
CPC .......... *G01F 1/00* (2013.01); *F02M 35/10386* (2013.01); *G01F 1/684* (2013.01); *G01F 1/6842* (2013.01)

(58) Field of Classification Search
CPC .......... G01F 1/00; G01F 1/684; G01F 1/6842; F02M 35/10386
See application file for complete search history.

(56) References Cited

U.S. PATENT DOCUMENTS 5,186,044 A   2/1993  Igarashi et al.
6,516,785 B1  2/2003  Nakada et al.
(Continued)

FOREIGN PATENT DOCUMENTS

DE   103 27 252 A1   1/2004
DE   103 05 694 A1   7/2004
(Continued)

OTHER PUBLICATIONS

International Search Report (PCT/ISA/210) issued in PCT Application No. PCT/JP2016/072710 dated Nov. 22, 2016 with English translation (Two (2) pages).
(Continued)

*Primary Examiner* — Freddie Kirkland, III
(74) *Attorney, Agent, or Firm* — Crowell & Moring LLP

(57) ABSTRACT

To prevent a circuit board and circuit board wiring from being damaged at the time of assembling a physical quantity detection device. A physical quantity detection device of the present invention is characterized by having, on a circuit board, a sensor unit wherein a flow rate detection unit is disposed, a circuit unit wherein a circuit element is disposed, and a partitioning wall that partitions the sensor unit and the circuit unit from each other. The physical quantity detection device is also characterized in that an internal layer conductor for electrically connecting the flow rate detection unit and the circuit unit to each other is provided on a circuit board internal layer where the partitioning wall is positioned.

8 Claims, 31 Drawing Sheets

(56) References Cited

U.S. PATENT DOCUMENTS

| | | | |
|---|---|---|---|
| 8,215,160 B2* | 7/2012 | Saito | F02D 41/187 73/114.34 |
| 8,347,707 B2* | 1/2013 | Uramachi | G01F 1/6842 73/204.22 |
| 8,549,901 B2* | 10/2013 | Saito | F02D 41/187 73/114.33 |
| 8,677,811 B2 | 3/2014 | Tagawa et al. | |
| 9,587,970 B2* | 3/2017 | Morino | F02D 41/187 |
| 9,851,234 B2* | 12/2017 | Isoya | G01F 1/684 |
| 9,989,390 B2* | 6/2018 | Tashiro | F02D 41/182 |
| 10,203,257 B2* | 2/2019 | Yogo | G01F 1/50 |
| 2003/0233886 A1 | 12/2003 | Uramachi et al. | |
| 2005/0120790 A1 | 6/2005 | Tanaka et al. | |
| 2010/0031742 A1 | 2/2010 | Muziol et al. | |
| 2010/0180675 A1 | 7/2010 | Schneider et al. | |
| 2015/0059454 A1 | 3/2015 | Vaupel et al. | |
| 2017/0241820 A1* | 8/2017 | Ogata | G01F 1/684 |

FOREIGN PATENT DOCUMENTS

| | | |
|---|---|---|
| DE | 10 2004 058 392 A1 | 7/2005 |
| DE | 10 2007 024 865 A1 | 12/2008 |
| DE | 10 2014 112 495 A1 | 3/2015 |
| EP | 1 065 476 A1 | 1/2001 |
| EP | 1 342 909 A2 | 9/2003 |
| EP | 1 790 954 A2 | 5/2007 |
| EP | 2 154 493 A2 | 2/2010 |
| EP | 2 472 236 A1 | 7/2012 |
| EP | 2 789 994 A1 | 10/2014 |
| EP | 3 176 544 A1 | 6/2017 |
| EP | 3 176 545 A1 | 6/2017 |
| EP | 3 252 437 A1 | 12/2017 |
| GB | 2 393 518 A | 3/2004 |
| JP | 2000-2572 A | 1/2000 |
| JP | 2002-148077 A | 5/2002 |
| JP | 2006-258677 A | 9/2006 |
| JP | 2010-151795 A | 7/2010 |
| JP | 2015-68794 A | 4/2015 |
| JP | 2015-132632 A | 7/2015 |
| JP | 2015-132633 A | 7/2015 |
| JP | 2016-31341 A | 3/2016 |
| JP | 2016-90413 A | 5/2016 |
| WO | WO 02/10694 A1 | 2/2002 |

OTHER PUBLICATIONS

Japanese-language Written Opinion (PCT/ISA/237) issued in PCT Application No. PCT/JP2016/072710 dated Nov. 22, 2016 (Three (3) pages).

Communication Pursuant to Rule 114(2) EPC issued in counterpart European Application No. 16850871.1 dated Oct. 11, 2018 (nine (9) pages).

Extended European Search Report issued in counterpart European Application No. 16850871.1 dated May 8, 2019 (11 pages).

European Communication pursuant to Rule 114(2) EPC issued in counterpart European Application No. 16850871.1 dated Apr. 30, 2019 (three (3) pages).

Japanese-language Office Action issued in counterpart Japanese Application No. 2017-542978 dated Nov. 5, 2019 with English translation (six pages).

* cited by examiner

PHYSICAL QUANTITY DETECTION DEVICE

TECHNICAL FIELD

The present invention relates to a physical quantity detector for intake air in an internal combustion engine.

BACKGROUND ART

PTL 1 discloses a structure in which a multilayered substrate is formed by stacking a plurality of substrates with metal mainly including Ag used at a through hole and inner layer conductors. A solder paste is spread over the through hole formed in the substrate disposed on the surface of the multilayered substrate, and electronic components, such as chip resistors, are mounted on the solder paste so as not to form a wiring pattern on the uppermost surface. In PTL 1, the electronic components forming a circuit is connected to a flow rate sensor element with inner layer conductors. A circuit board is a ceramic substrate with the uppermost surface thereof being protected by glass.

CITATION LIST

Patent Literature

PTL 1: Japanese Unexamined Patent Publication No. 2006-258677

SUMMARY OF INVENTION

Technical Problem

In a typical structure, as recited in PTL 1, in which the flow rate sensor element and the electronic components forming the circuit are mounted on the same substrate, the flow rate sensor is exposed in the air, and the circuit is sealed for protection. Therefore, a partition to protect and seal the circuit portion is needed between the flow rate sensor and the circuit. Since the partition is adhered to the circuit board, the circuit board receives stress when the partition hits the circuit board during adhering process. Thus, the circuit board would be damaged if the circuit board is a ceramic substrate. In particular, the glass that protects a wiring pattern formed on the uppermost surface may possibly be damaged.

The present invention has been made in view of the above, and it is an object of the present invention to provide a physical quantity detector that decreases damage of wiring on a circuit board during mounting of the circuit board and a housing.

Solution to Problem

To solve the above problem, a physical quantity detector according to an embodiment of the present invention includes a circuit board including a sensor portion in which a sensor element for detecting a physical quantity is disposed, and a circuit portion in which a circuit element is disposed, and a partition wall configured to partition the sensor portion and the circuit portion, in which an inner layer conductor is provided in an inner layer of the circuit board where the partition wall is disposed for electrically connecting the sensor portion to the circuit portion.

Advantageous Effects of Invention

According to the embodiment of the present invention, a simple structure decreases damage to the wiring of the circuit board during mounting of the circuit board and the housing. Other problems, structures, and effects not described above will be apparent from the following description of the embodiment.

DESCRIPTION OF EMBODIMENTS

Embodiments for implementing the invention (hereinafter referred to as embodiments) described below solve various problems desired for commercial products. In particular, the embodiments solve problems desired for the use of detectors for detecting physical quantities of intake air for a vehicle, and therefore achieve various effects. One of various problems solved by the embodiments is recited in the section of the problems to be solved by the invention mentioned above. One of various effects achieved by the embodiments is the effect recited in the section of the effect of the invention mentioned above. The various problems solved by the embodiments described below and the various effects achieved by the embodiments will be described in the following description of the embodiments. Therefore, the problems and effects solved and achieved by the embodiments described below also include what is not described in the sections of the problems to be solved and the effect of the invention.

In the embodiments described below, the same reference signs in different drawings indicate the same structure and achieve the same function and effect. In some cases, reference signs are given to the structure that has already been described and the description thereof will not be repeated.

Figure 1:
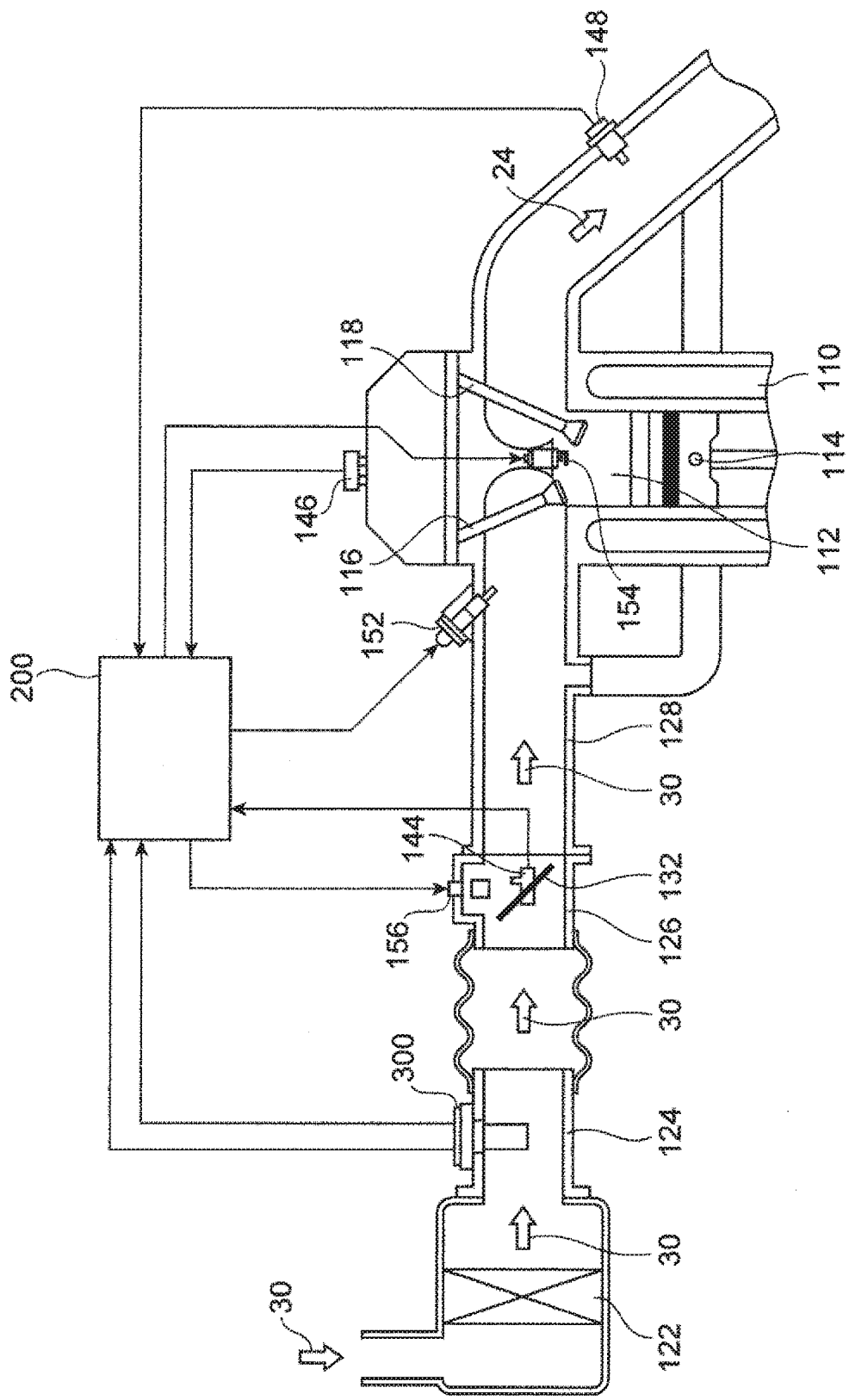
FIG. 1 illustrates an example system using a physical quantity detector according to an embodiment of the present invention in an internal combustion engine control system.

1. Example Using Physical Quantity Detector According to Embodiment of the Present Invention in Internal Combustion Engine Control System FIG. 1 is an example system using a physical quantity detector according to an embodiment of the present invention in an internal combustion engine control system. In accordance with the operation of an internal combustion engine 110 including an engine cylinder 112 and an engine piston 114, an intake air is suctioned through an air cleaner 122 as a gas to be measured 30 and guided to a combustion chamber of the engine cylinder 112 through a main channel 124 including an intake body, a throttle body 126, and an intake manifold 128. A physical quantity of the gas to be measured 30, which is an intake air guided to the combustion chamber, is detected by a physical quantity detector 300 according to the present invention. Fuel is supplied through a fuel injection valve 152 in accordance with the detected physical quantity, and guided to the combustion chamber as a mixed air of the fuel and the intake air 20. In the present embodiment, the fuel injection valve 152 is provided at an air intake port of the internal combustion engine. The fuel injected to the air intake port is mixed with the gas to be measured 30, which is the intake air, to form a mixed air. The mixed air is guided to the combustion chamber via an intake valve 116 and burned to generate mechanical energy.

The fuel and air guided to the combustion chamber are in a mixed state of fuel and air, and the mixture explosively burns by spark ignition of an ignition plug 154 to generate mechanical energy. After the combustion, the gas is guided to an exhaust pipe via an exhaust valve 118 and discharged externally from the vehicle as an exhaust gas 24 through the exhaust pipe. A throttle valve 132 whose opening angle changes with the operation of an acceleration pedal controls a flow rate of the gas to be measured 30 provided as the intake air and guided to the combustion chamber. A fuel supply amount is controlled in accordance with the flow rate of the intake air guided to the combustion chamber. A driver controls the opening angle of the throttle valve 132 to control the flow rate of the intake air guided to the combustion chamber. This enables controlling of the mechanical energy generated by the internal combustion engine.

1.1 Outline of Controlling Control System of Internal Combustion Engine

The physical quantity detector 300 detects physical quantities, such as a flow rate, temperature, humidity, and pressure, of the gas to be measured 30, which is the intake air introduced through an air cleaner 122 to flow through a main channel 124. The physical quantity detector 300 then supplies an electrical signal representing the physical quantities of the intake air to a controller 200. Meanwhile, the controller 200 receives an output of the throttle angle sensor 144 that measures an opening angle of the throttle valve 132, and an output of a rotational angle sensor 146 that measures positions and conditions of the engine piston 114, an intake valve 116, and the exhaust valve 118 of the internal combustion engine and also measures the rotational speed of the internal combustion engine. The controller 200 also receives an output of an oxygen sensor 148 in order to measure the state of a mixture ratio of the fuel amount and the air amount according to the state of the exhaust gas 24.

The controller 200 calculates a fuel injection amount and ignition timing in accordance with the physical quantities of the intake air provided as the output of the physical quantity detector 300 and the rotational speed of the internal combustion engine measured in accordance with the output of the rotational angle sensor 146. In accordance with the calculation results, the fuel amount supplied from the fuel injection valve 152 and the ignition timing by the ignition plug 154 are controlled. In practice, the fuel supply amount and the ignition timing are finely controlled in accordance with changes of the temperature and the throttle angle detected by the physical quantity detector 300, changes of the rotational speed of the engine, and the air-fuel ratio measured by an oxygen sensor 148. Further, the controller 200 controls the amount of air bypassing the throttle valve 132 during idling operation of the internal combustion engine by an idle air control valve 156, and therefore controls the rotational speed of the internal combustion engine during the idling operation.

1.2 Importance of Improving Detection Accuracy of Physical Quantity Detector and Installation Environment of Physical Quantity Detector The fuel supply amount and the ignition timing, which are both major control quantities of the internal combustion engine, are calculated using the output of the physical quantity detector 300 as the main parameter. It is therefore important to improve detection accuracy, decreasing chronological change, and improving reliability of the physical quantity detector 300 for improving control accuracy and achieving reliability of the vehicle.

In particular, the need for saving power consumption and purifying the exhaust gas is soaring in recent years. To respond to such needs, it is very important to improve the detection accuracy of the physical quantities of the intake air 20 detected by the physical quantity detector 300. It is also important to maintain a high reliability of the physical quantity detector 300.

Vehicles on which the physical quantity detector 300 is mounted are usually used in an environment subjected to large changes of temperature and humidity. The physical quantity detector 300 desirably considers how to respond to such changes of temperature and humidity in the use environment and how to respond to dust or contamination materials.

Meanwhile, the physical quantity detector 300 is mounted on the inlet pipe that is affected by heat from the internal combustion engine. Thus, the heat of the internal combustion engine is transferred to the physical quantity detector 300 through the main channel 124 which functions as the inlet pipe. Since the physical quantity detector 300 transfers heat to and from the gas to be measured to detect the flow rate of the gas to be measured, it is important to minimize the influence of external heat.

The physical quantity detector 300 mounted on the vehicle does not only solve the problem recited in the section of the problem to be solved by the invention and achieves the effect recited in the section of the effect of the invention as described below, but also solve various problems sought for the physical quantity detector 300 as a commercial product and achieve various effects as described below by sufficiently considering various problems described above. The problems and effects solved and achieved by the physical quantity detector 300 are specifically described in the description of embodiments below.

2. Structure of Physical Quantity Detector 300

2.1 Structure of External Appearance of Physical Quantity Detector 300

Figure 2A:
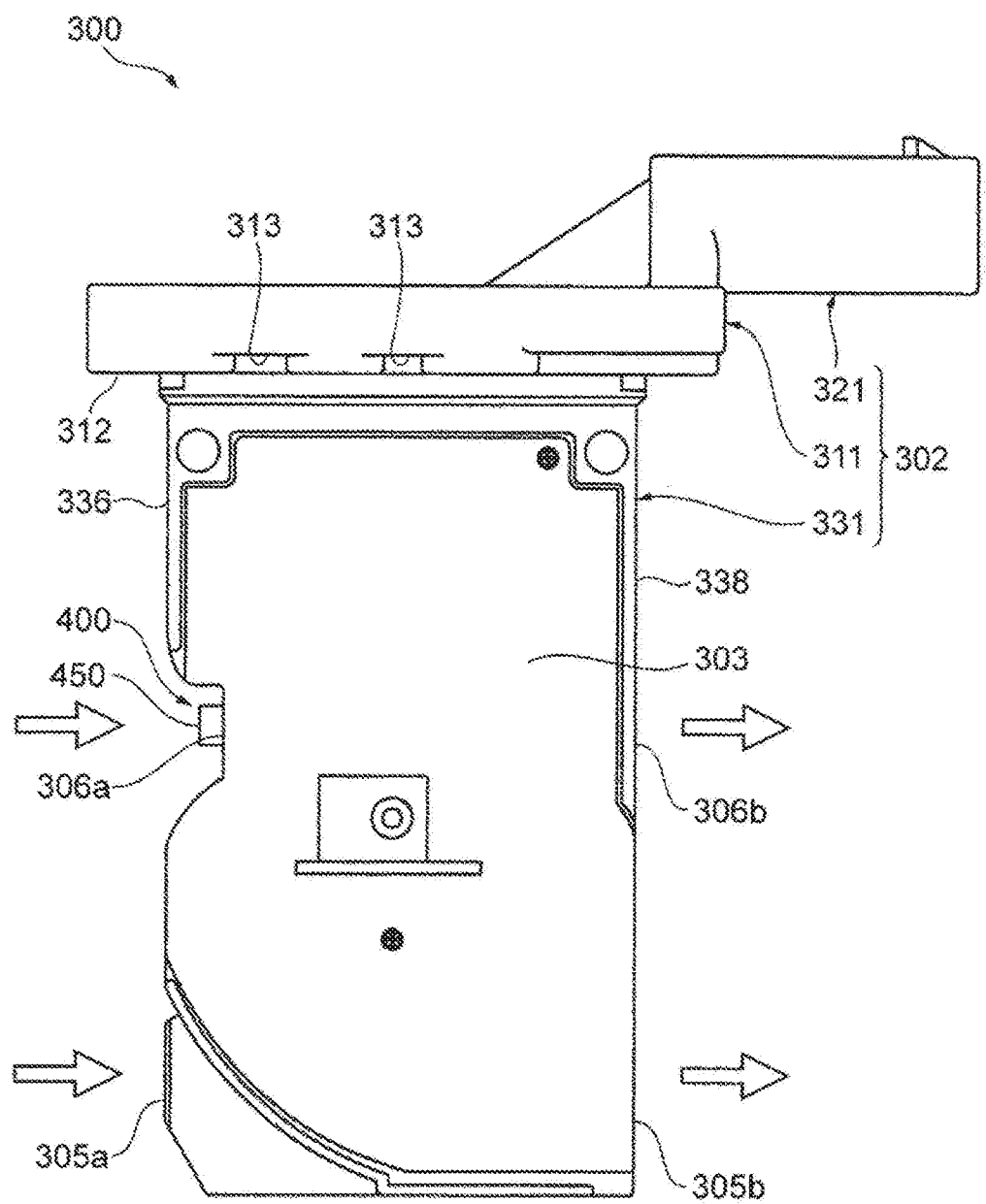
FIG. 2A is a front view of the physical quantity detector.
Figure 2B:
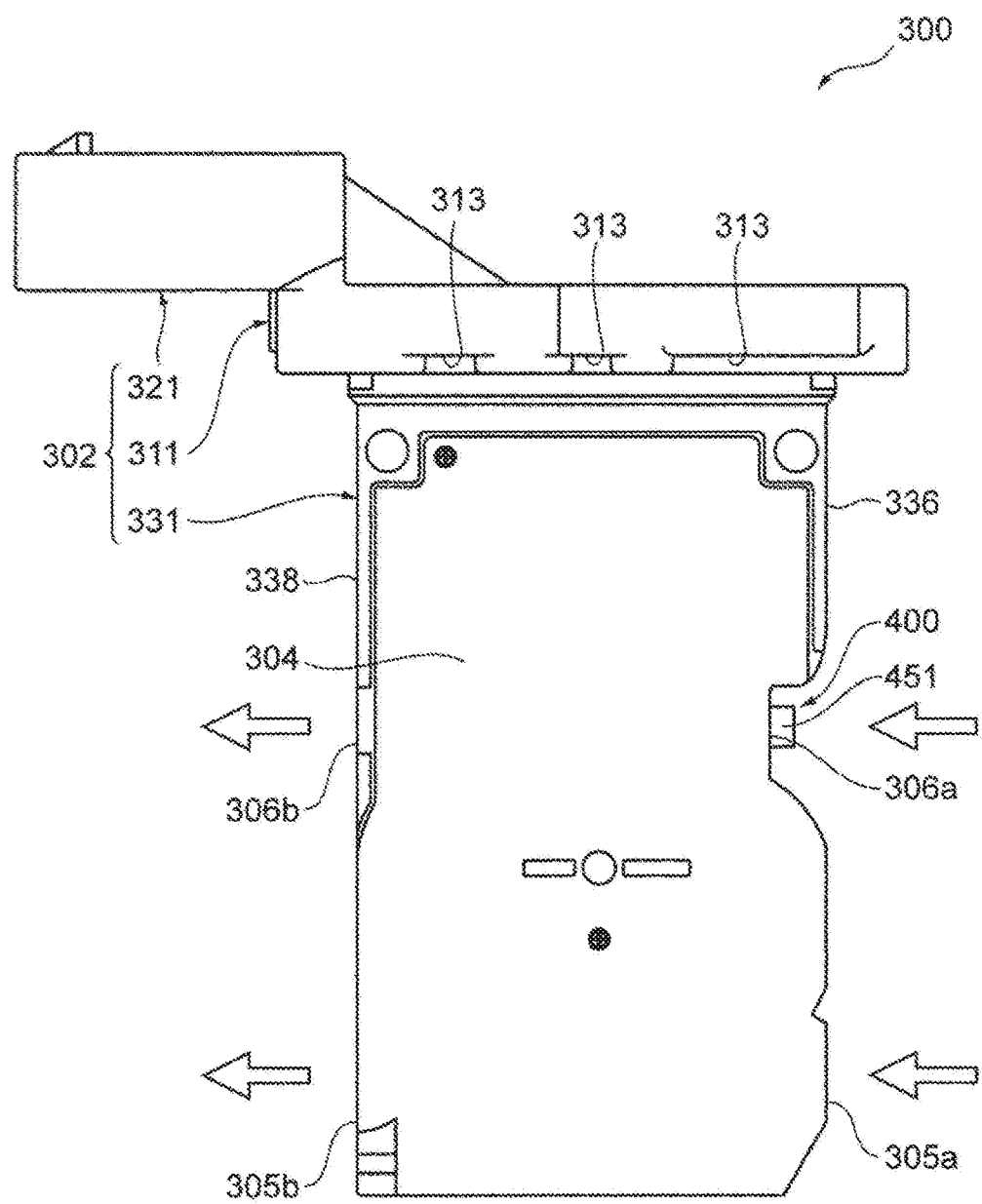
FIG. 2B is a rear view of the physical quantity detector.
Figure 2C:
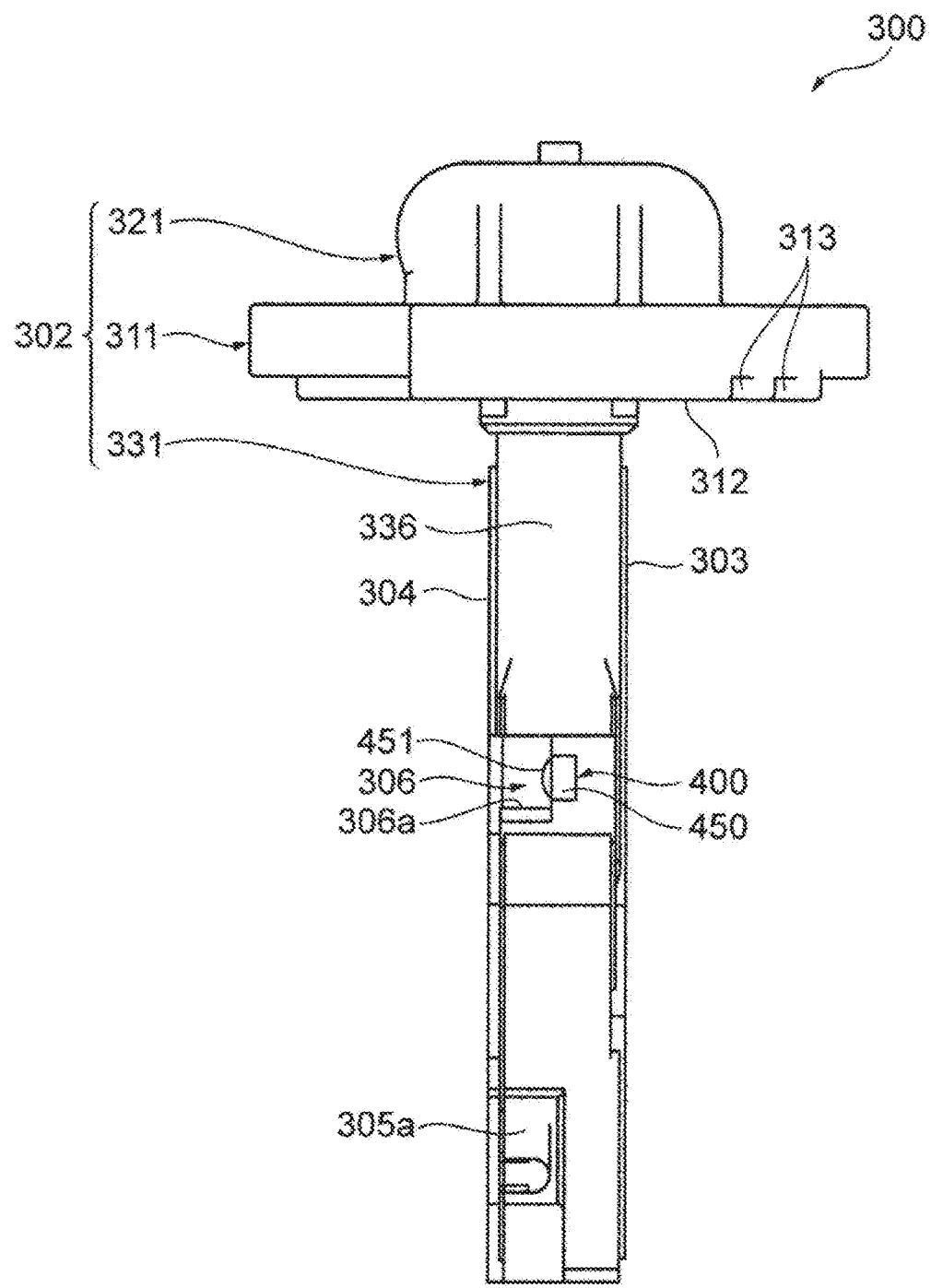
FIG. 2C is a left side view of the physical quantity detector.
Figure 2D:
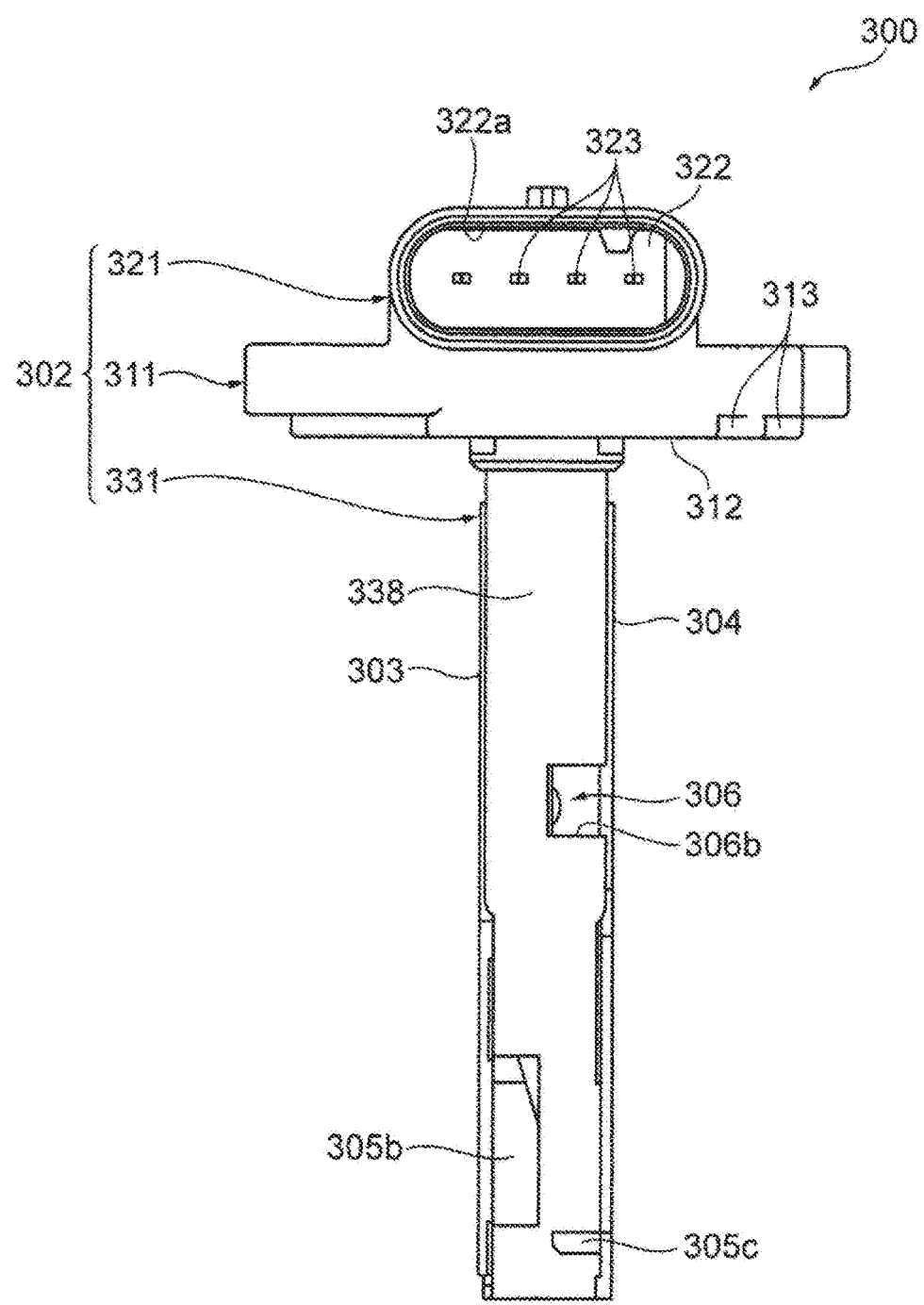
FIG. 2D is a right side view of the physical quantity detector.
Figure 2E:
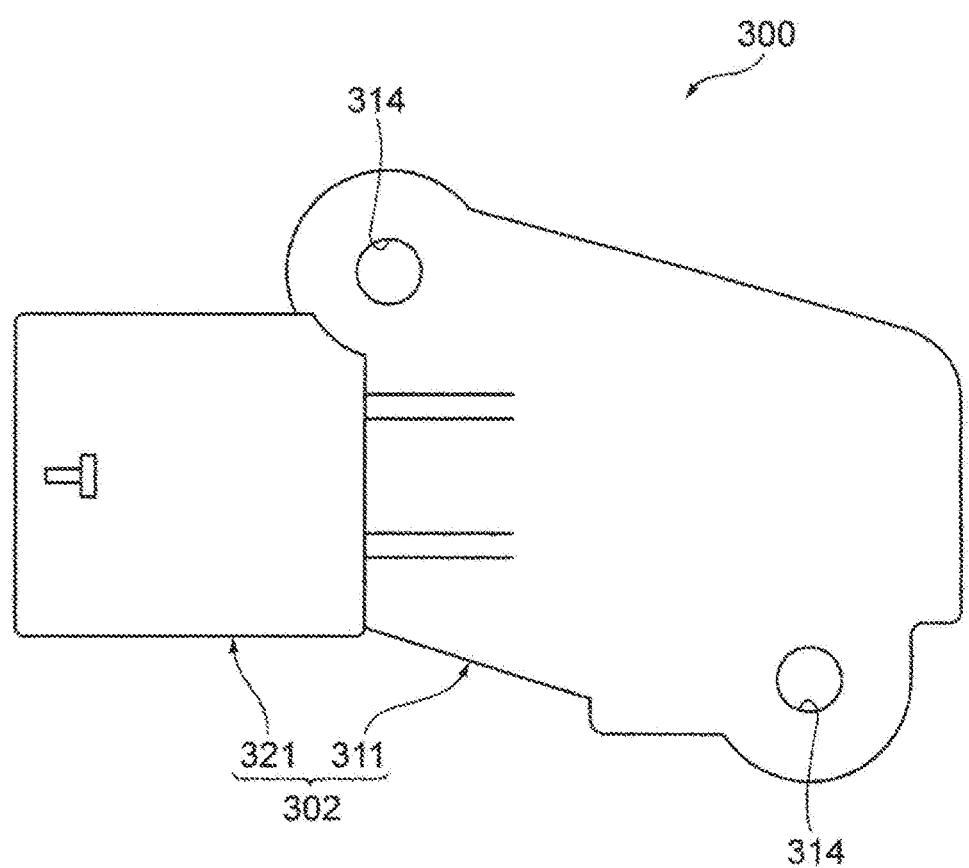
FIG. 2E is a plan view of the physical quantity detector.
Figure 2F:
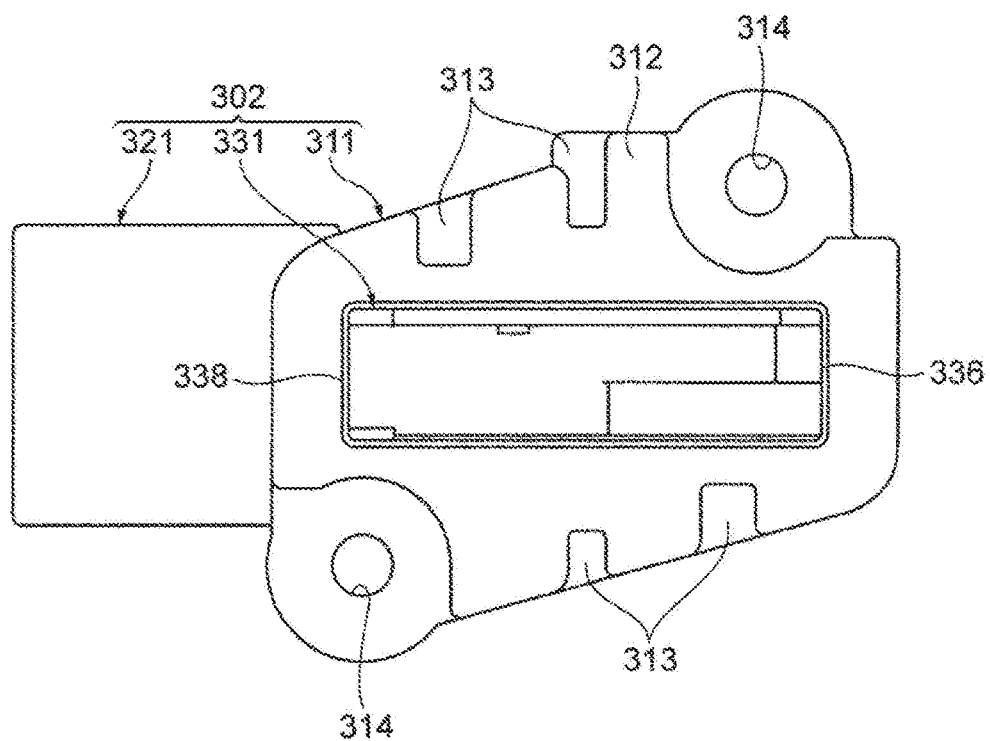
FIG. 2F is a bottom view of the physical quantity detector.

FIGS. 2A to 2F illustrate external appearance of the physical quantity detector 300, in which FIG. 2A is a front view, FIG. 2B is a rear view, FIG. 2C is a left side view, FIG. 2D is a right side view, FIG. 2E is a plan view, and FIG. 2F is a bottom view of the physical quantity detector 300.

The physical quantity detector 300 includes a housing 302, a front cover 303, and a rear cover 304. The housing 302 is formed by molding a synthetic resin material. The housing 302 includes a flange 311 for fixing the physical quantity detector 300 to an intake body formed as a main channel 124, an external connecting portion 321 projecting from the flange 311 with a connector for electrically connecting to an external device, and a measuring portion 331 extending from the flange 311 to project toward the center of the main channel 124.

Figure 3A:
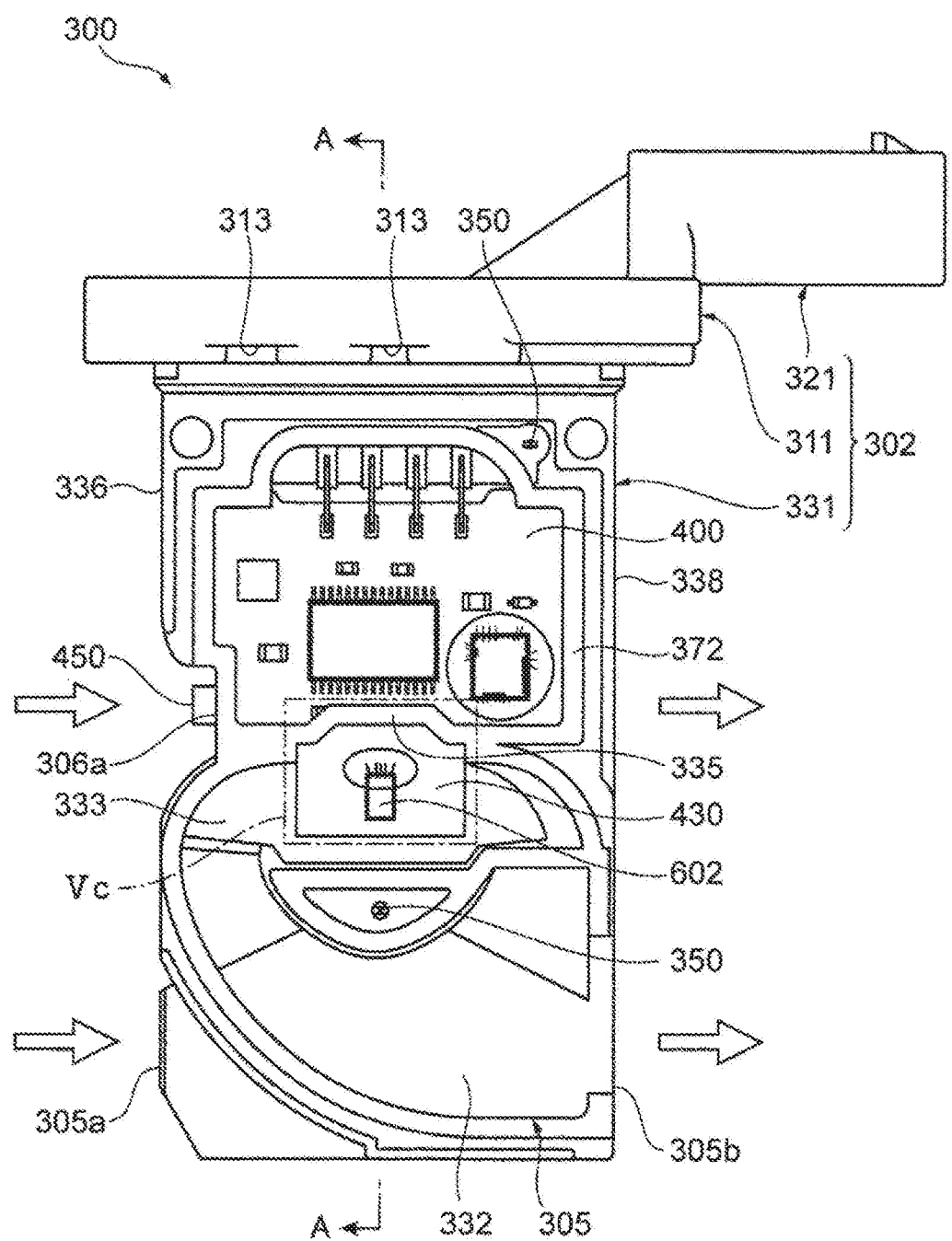
FIG. 3A is a front view of the physical quantity detector when a front cover is removed.
Figure 3B:
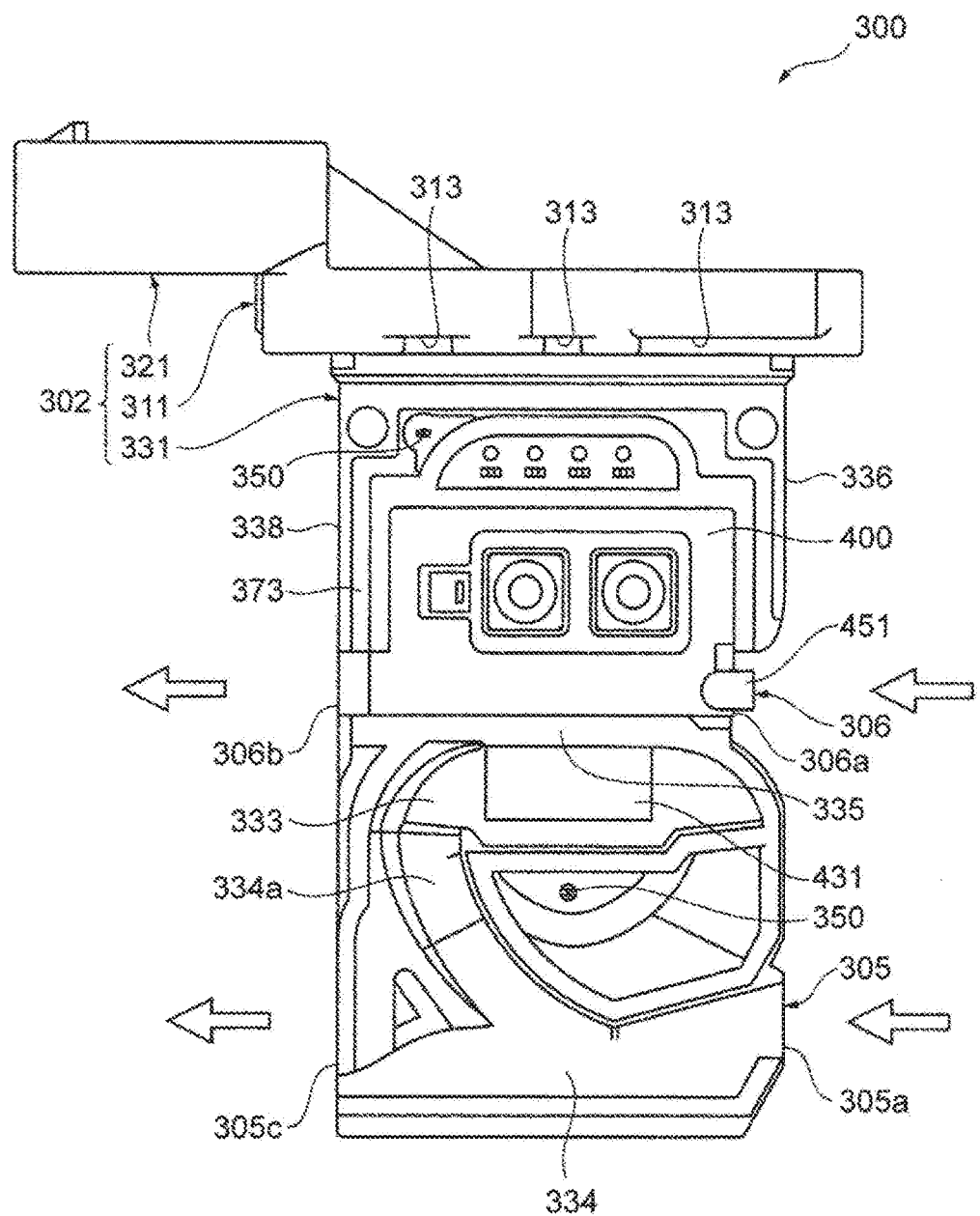
FIG. 3B is a rear view of the physical quantity detector when a rear cover is removed.

In the measuring portion 331, a circuit board 400 is formed integrally with the measuring portion 331 by insert molding during molding of the housing 302 (see FIGS. 3A and 3B). The circuit board 400 at least includes a detecting portion for detecting a physical quantity of the gas to be measured 30 flowing through the main channel 124, and a circuit portion for processing a signal detected by the detecting portion. The detecting portion is disposed at a position exposed to the gas to be measured 30, and the circuit portion is disposed in a circuit chamber sealed by the front cover 303.

A sub-channel groove is formed on both front and rear surfaces of the measuring portion 331 to form a first sub-channel 305 by the cooperation of the front and rear covers 303 and 304. Provided at the tip end portion of the measuring portion 331 are a first sub-channel inlet 305a for partially taking in the gas to be measured 30, such as intake air, to the first sub-channel 305, and a first sub-channel outlet 305b for returning the gas to be measured 30 to the main channel 124 from the first sub-channel 305. The circuit board 400 partially projects into the middle of the course of the first sub-channel 305 and, at the projecting portion, a flow rate detecting portion 602 (see FIG. 3A) is disposed as a detecting portion to detect the flow rate of the gas to be measured 30.

A second sub-channel 306 is provided for partially taking in the gas to be measured 30, such as the intake air, into a sensor chamber Rs. The second sub-channel 306 is located in the middle portion of the measuring portion 331 closer than the first sub-channel 305 to the flange 311. The second sub-channel 306 is formed by the cooperation of the measuring portion 331 and the rear cover 304. The second sub-channel 306 has a second sub-channel inlet 306a formed in an upstream-side outer wall 336 for taking the gas to be measured 30, and a second sub-channel outlet 306b formed in a downstream-side outer wall 338 for returning the gas to be measured 30 to the main channel 124 from the second sub-channel 306. The second sub-channel 306 communicates with the sensor chamber Rs formed on the rear side of the measuring portion 331. In the sensor chamber Rs, a pressure sensor and a humidity sensor are disposed as the detecting portion provided on the rear surface of the circuit board 400.

2.2 Effect Based on Structure of External Appearance of Physical Quantity Detector 300

The physical quantity detector 300 has the second sub-channel inlet 306a in the middle portion of the measuring portion 331, which extends toward the center of the main channel 124 from the flange 311, and the first sub-channel inlet 305a at the tip end portion of the measuring portion 331. This allows the gas located closer to the center portion away from the inner wall surface and not in the vicinity of the inner wall surface of the main channel 124 to be taken into the first and second sub-channels 305 and 306. Thus, the physical quantity detector 300 can measure the physical quantities of the gas located away from the inner wall of the main channel 124, and the measurement error of the physical quantity can be reduced regardless of the decrease of heat and flow rate in the vicinity of the inner wall surface.

The measuring portion 331 is in an elongated shape along an axis extending toward the center of the main channel 124 from the outer wall, and has a narrow thickness as illustrated in FIGS. 2C and 2D. That is, the measuring portion 331 of the physical quantity detector 300 has a thin side width and an approximately rectangular front face. This allows the physical quantity detector 300 to have a sufficiently long first sub-channel 305, while reducing the resistance value of the fluid with respect to the gas to be measured 30. The physical quantity detector 300, therefore, can reduce the resistance value of the fluid, while achieving highly accurate measurement of the flow rate of the gas to be measured 30.

2.3 Structure and Effect of Flange 311

The flange 311 has a plurality of recesses 313 in a bottom surface 312 facing the main channel 124 in order to decrease a heat transfer surface between the flange 311 and the main channel 124 and prevents the influence of heat to the physical quantity detector 300. The measuring portion 331 of the physical quantity detector 300 is inserted into the main channel 124 through an attaching hole provided in the main channel 124 such that the bottom surface 312 of the flange 311 faces the main channel 124. The main channel 124 is, for example, an intake body, and is often kept at a high temperature. In contrast, the main channel 124 may be at an extremely low temperature during start-up in cold climates. Such high or low temperature states of the main channel 124 affect the measurement of various physical quantities and would decrease the measurement accuracy. The flange 311 has the recesses 313 in the bottom surface 312, so that space is formed between the main channel 124 and the bottom surface 312 facing the main channel 124. This decreases heat transfer from the main channel 124 toward the physical quantity detector 300 and prevents decrease of measurement accuracy because of heat.

The flange 311 has screw holes 314 for fixing the physical quantity detector 300 on the main channel 124. A space is formed between the main channel 124 and a surface facing the main channel 124 around each screw hole 314 such that the surface facing the main channel 124 around the screw hole 314 is located away from the main channel 124. This structure decreases heat transfer from the main channel 124 toward the physical quantity detector 300 and prevents decrease of the measurement accuracy because of heat.

2.4 Structure of External Connecting Portion 321

The external connecting portion 321 includes a connector 322 provided on the upper surface of the flange 311 and projecting downstream in a flowing direction of the gas to be measured 30 from the flange 311. The connector 322 includes an insertion hole 322a to which a communication cable connecting to the controller 200 is inserted. Four external terminals 323 are provided in the insertion hole 322a, as illustrated in FIG. 2D. The external terminals 323 function as terminals for outputting the physical quantity information as a measurement result of the physical quantity detector 300, and also function as a power supply terminal for supplying a direct current power to operate the physical quantity detector 300.

The connector 322 project downstream in the flowing direction of the gas to be measured 30 from the flange 311, and is shaped to allow insertion from the downstream side to the upstream side in the flowing direction. However, the shape of the connector 322 is not limited to this shape and various changes are possible. For example, the connector 322 may project perpendicularly from the upper surface of the flange 311 to allow insertion along the extending direction of the measuring portion 331.

3. Overall Structure of Housing 302 and Effect Thereof 3.1 Overall Structure

Figure 3C:
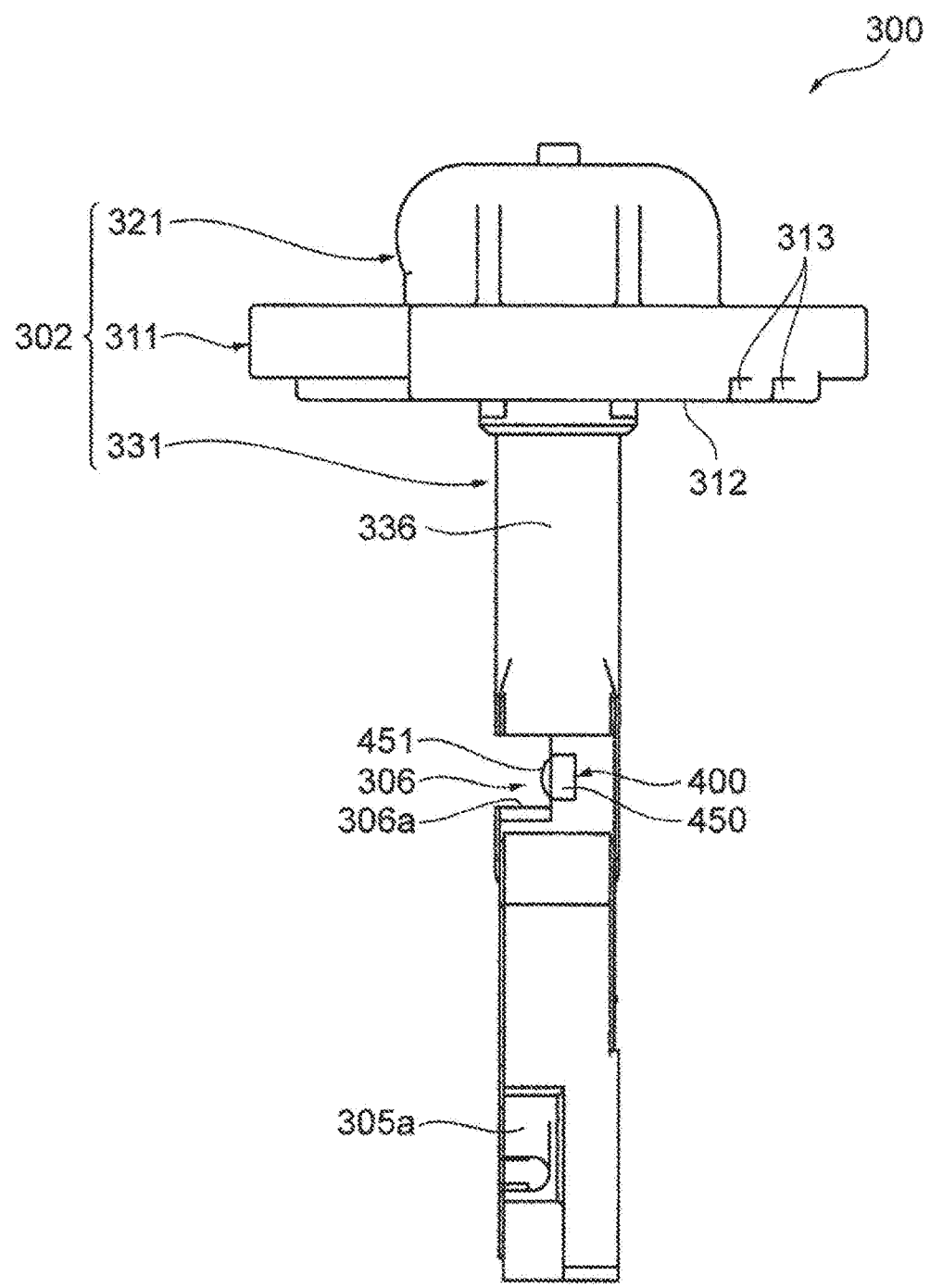
FIG. 3C is a left side view of the physical quantity detector when the front and rear covers are removed.
Figure 3D:
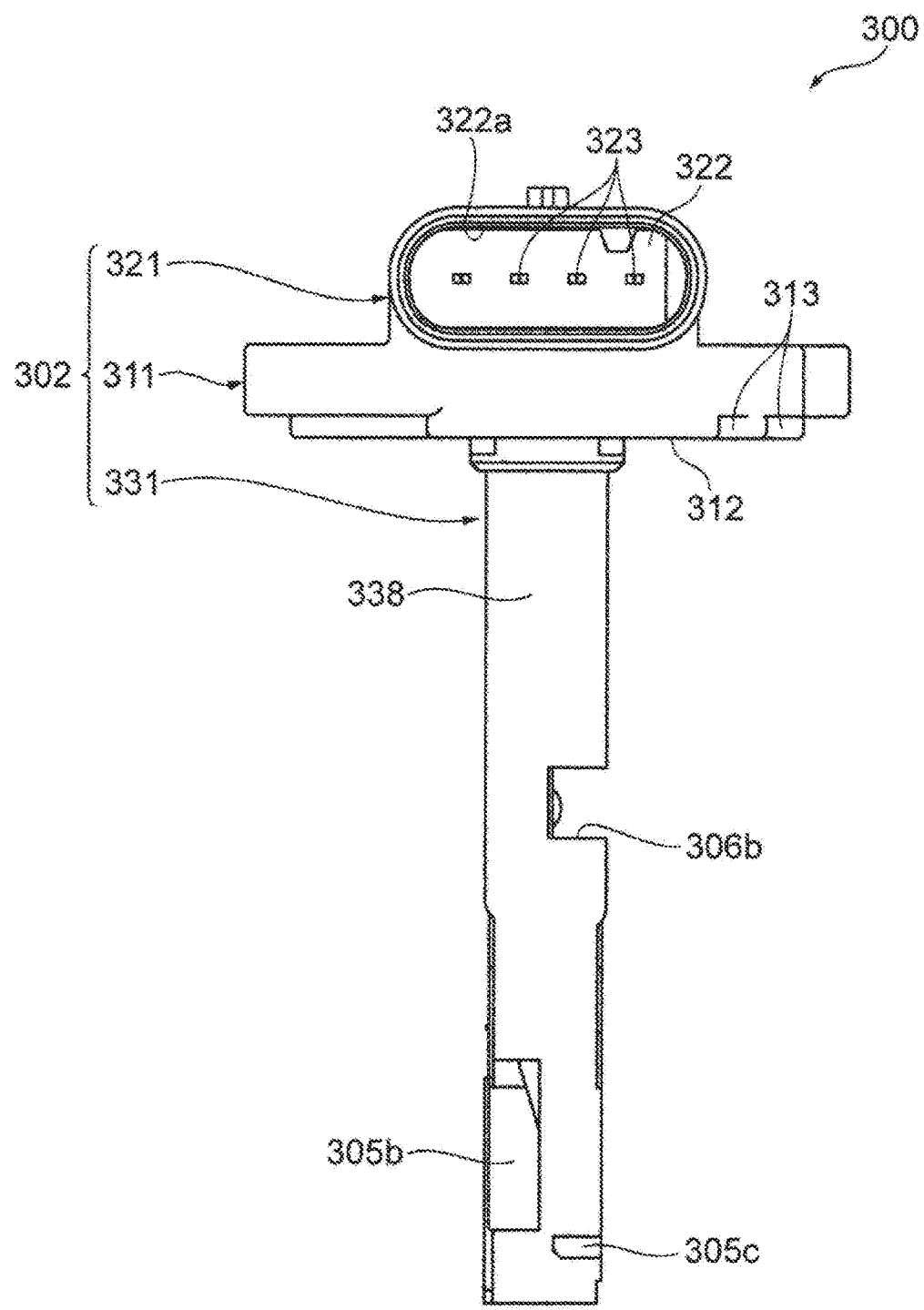
FIG. 3D is a right side view of the physical quantity detector when the front and rear covers are removed.
Figure 3E:
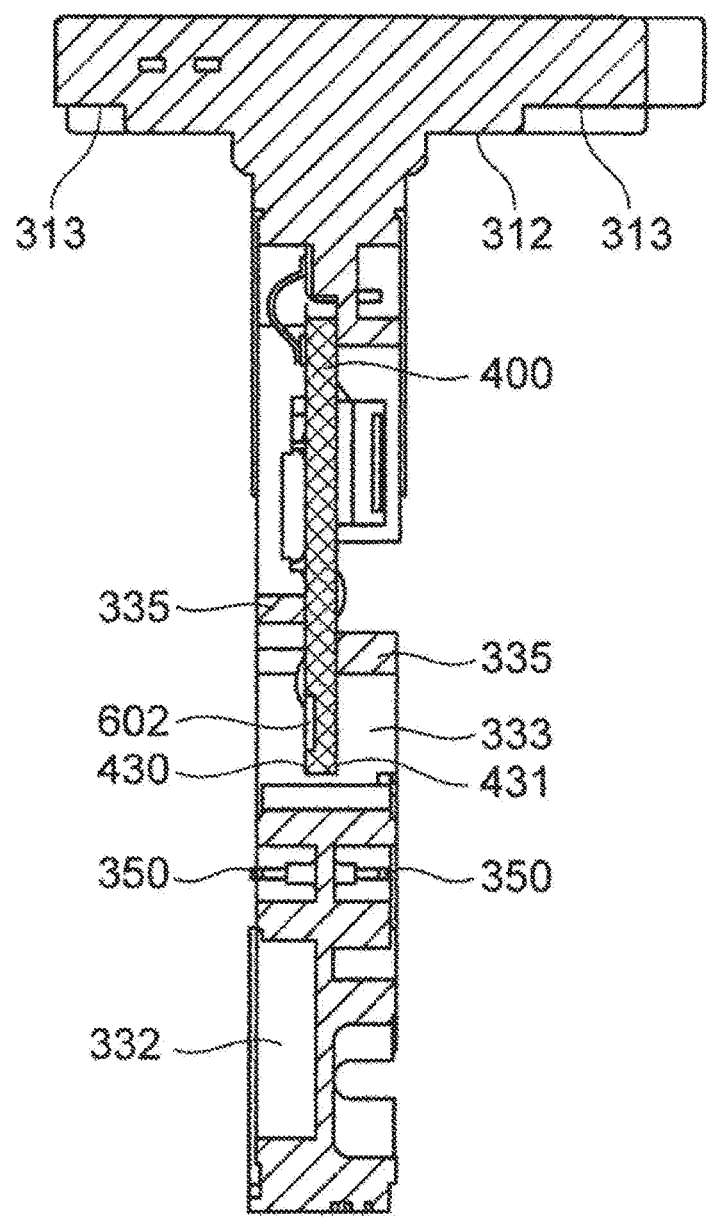
FIG. 3E is a cross-sectional view of FIG. 3A when seen from arrows along line A-A.

Next, an overall structure of the housing 302 is described by referring to FIGS. 3A to 3E. FIGS. 3A to 3E illustrate several states of the housing 302 when the front and rear covers 303 and 304 are removed from the physical quantity detector 300. FIG. 3A is a front view of the housing 302, FIG. 3B is a rear view of the housing 302, FIG. 3C is a right side view of the housing 302, FIG. 3D is a left side view of the housing 302, and FIG. 3E is a cross-sectional view of FIG. 3A along line A-A.

The housing 302 is formed such that the measuring portion 331 extends from the flange 311 toward the center of the main channel 124. The circuit board 400 is formed by insert molding on the base end side of the measuring portion 331. The circuit board 400 is arranged in parallel with the surface of the measuring portion 331 in the middle of the front and rear surfaces of the measuring portion 331, and integrally molded with the housing 302 so that the base end side of the measuring portion 331 is divided into one and the other sides in the thickness direction.

A circuit chamber Rc accommodating the circuit portion of the circuit board 400 is formed on the front surface of the measuring portion 331. The sensor chamber Rs accommodating the pressure sensor 421 and the humidity sensor 422 are formed on the rear surface of the measuring portion 331. The circuit chamber Rc is sealed by attaching the front cover 303 to the housing 302 and is completely isolated from outside. Meanwhile, the second sub-channel 306 and the sensor chamber Rs, which is formed as an interior space communicating with the outside of the measuring portion 331 through the second sub-channel 306, are formed by attaching the rear cover 304 to the housing 302. The circuit board 400 partially projects into the first sub-channel 305 from a partition wall 335 that partitions the circuit chamber Rc of the measuring portion 331 from the first sub-channel 305. The flow rate detecting portion 602 is provided on the projecting portion of a flow channel surface for measurement 430.

3.2 Structure of Sub-Channel Groove

On the tip end side of the measuring portion 331 in the longitudinal direction, a sub-channel groove forming the first sub-channel 305 is provided. The sub-channel groove for forming the first sub-channel 305 includes a front-side sub-channel groove 332 illustrated in FIG. 3A and a rear-side sub-channel groove 334 illustrated in FIG. 3B. As illustrated in FIG. 3A, the front-side sub-channel groove 332 extends to the upstream-side outer wall 336 from the first sub-channel outlet 305b formed in the downstream-side outer wall 338 of the measuring portion 331, and gradually curves toward the flange 311 which is on the base end side of the measuring portion 331. Subsequently, the front-side sub-channel groove 332 communicates with an opening 333 that penetrates through the measuring portion 331 in the thickness direction at a position near the upstream-side outer wall 336. The opening 333 is formed along the flowing direction of the gas to be measured in the main channel 124 so as to extend between the upstream-side outer wall 336 and the downstream-side outer wall 338.

As illustrated in FIG. 3B, the rear-side sub-channel groove 334 extends toward the downstream-side outer wall 338 from the upstream-side outer wall 336, and branches into two grooves at an intermediate position between the upstream-side and downstream-side outer walls 336 and 338. One groove continues to extend linearly as an exhaust channel to the opening of an exhaust outlet 305c of the downstream-side outer wall 338. The other groove extends to the downstream-side outer wall 338 and gradually curves toward the flange 311, which is on the base end side of the measuring portion 331 until the other groove communicates with the opening 333 at a position near the downstream-side outer wall 338.

The rear-side sub-channel groove 334 forms an input groove to which the gas to be measured 30 flows from the main channel 124. The front-side sub-channel groove 332 forms an exit groove for returning the gas to be measured 30 taken from the rear-side sub-channel groove 334 to the main channel 124. Since the front-side and rear-side sub-channel grooves 332 and 334 are provided at the tip end portion of the housing 302, a gas located in a portion of the main channel 124 away from the inner wall surface, or a gas flowing through a portion of the main channel 124 near the center portion, can be taken as the gas to be measured 30. The gas flowing through the main channel 124 in the vicinity of the inner wall surface is often affected by the temperature of the wall surface of the main channel 124, so that the gas has a temperature different from an average temperature of the gas, such as the intake air 20, flowing through the main channel 124. Further, the gas flowing through the main channel 124 in the vicinity of the inner wall surface often shows a flow rate slower than the average flow rate of the gas flowing through the main channel 124. The physical quantity detector 300 of the embodiment hardly suffers from such influence, so that the decrease of the measurement accuracy can be minimized.

As illustrated in FIG. 3B, the gas to be measured 30 flowing through the main channel 124 is partially taken into the rear-side sub-channel groove 334 from the first sub-channel inlet 305a to flow through the rear-side sub-channel groove 334. The gas to be measured 30 includes a foreign object having a large mass which flows with some of the gas to be measured into the exhaust channel continuously extending linearly from the branch portion, and is discharged to the main channel 124 from the exhaust outlet 305c of the downstream-side outer wall 338.

The rear-side sub-channel groove 334 is deepened as it extends further, and the gas to be measured 30 gradually moves to the front side of the measuring portion 331 as the gas to be measured 30 flows along the rear-side sub-channel groove 334. In particular, the rear-side sub-channel groove 334 is abruptly deepened at a steep slope portion 334a before the opening 333. The air having a small mass partially moves along the steep slope portion 334a to flow close to the flow channel surface for measurement 430 of the circuit board 400 in the opening 333. Meanwhile, a foreign object having a large mass can hardly change the course of flowing abruptly, and flows on the rear surface 431 of the flow channel surface for measurement.

As illustrated in FIG. 3A, the gas to be measured 30 that has moved to the front side through the opening 333 flows along the flow channel surface for measurement 430 of the circuit board where heat transfer is carried out with the flow rate detecting portion 602 provided on the flow channel surface for measurement 430. Thus, the flow rate is measured. The air guided to the front-side sub-channel groove 332 from the opening 333 also flows through the front-side sub-channel groove 332 and is discharged to the main channel 124 from the first sub-channel outlet 305b formed in the downstream-side outer wall 338.

A substance, such as dust, mixed in the gas to be measured 30 has a large inertia force, and can hardly change its course abruptly to the deeper portion of the groove along the surface of the steep slope portion 334a where the depth of the groove is deepened abruptly. Thus, the foreign object having a large mass moves through the rear surface 431 of the flow channel surface for measurement to decrease the possibility of moving the foreign object near the flow rate detecting portion 602. In the present embodiment, most of the foreign objects having a large mass other than gas pass by the rear surface 431 of the flow channel surface for measurement which is the rear side of the flow channel surface for measurement 430. Thus, the influence of contamination caused by the foreign objects, such as oil components, carbon, or dust, can decrease, and the decrease of the measurement accuracy can be prevented. In other words, the course of the gas to be measured 30 abruptly changes along the axis that crosses the axis of the flow of the main channel 124, whereby the influence of the foreign objects mixed in the gas to be measured 30 decreases.

3.3 Structure and Effect of Second Sub-Channel and Sensor Chamber

The second sub-channel 306 is formed in a straight line over the second sub-channel inlet and outlet 306a and 306b extending in parallel with the flange 311, and extends along the flowing direction of the gas to be measured 30. The second sub-channel inlet 306a is formed by notching a part of the upstream-side outer wall 336. The second sub-channel outlet 306b is formed by notching a part of the downstream-side outer wall 338. Specifically, as illustrated in FIG. 3C, the second sub-channel inlet and outlet 306a and 306b are formed at positions continuously along the upper surface of the partition wall 335 by partially notching the upstream-side and downstream-side outer walls 336 and 338, respectively, from the rear side of the measuring portion 331. The second sub-channel inlet and outlet 306a and 306b are notched to reach a depth position in flush with the rear side of the circuit board 400. The second sub-channel 306 functions as a cooling channel for cooling a board body 401, because the gas to be measured 30 passes along the rear surface of the board body 401 of the circuit board 400. The circuit board 400 includes components that are often heated, such as an LSI or a microcomputer (micon). Such heat can be transferred to the rear surface of the board body 401 and dissipated through the gas to be measured 30 passing through the second sub-channel 306.

The sensor chamber Rs is formed closer than the second sub-channel 306 to the base end side of the measuring portion 331. The gas to be measured 30 flows into the second sub-channel 306 via the second sub-channel inlet 306a, and partially flows into the sensor chamber Rs where the pressure and the humidity are detected by the pressure sensor 421 and the humidity sensor 422, respectively, in the sensor chamber Rs. Since the sensor chamber Rs is disposed closer than the second sub-channel 306 to the base end side of the measuring portion 331, the influence of dynamic pressure of the gas to be measured 30 that passes through the second sub-channel 306 can be decreased. This improves the detection accuracy of the pressure sensor 421 in the sensor chamber Rs.

When the measuring portion 331 is attached to the air intake channel with the tip end side of the measuring portion 331 directed downward, the fact that the sensor chamber Rs disposed closer than the second sub-channel 306 to the base end side of the measuring portion 331 prevents attaching of the contamination objects or water droplets, which are flowed to the second sub-channel 306 together with the gas to be measured 30, to the pressure sensor 421 or the downstream humidity sensor 422.

In particular, in the present embodiment, the pressure sensor 421 having a relatively large outer shape is disposed on the upstream side and the humidity sensor 422 having a relatively small outer shape is disposed on the downstream side of the pressure sensor 421 in the sensor chamber Rs, so that the contamination objects or water droplets flowed in with the gas to be measured 30 are attached to the pressure sensor 421 and not to the humidity sensor 422. This protects the humidity sensor 422 having a low resistance to the contamination objects or water droplets.

The pressure sensor 421 and the humidity sensor 422 are less susceptible to the flow of the gas to be measured 30 compared to the flow rate detecting portion 602. In particular, the humidity sensor 422 only needs a certain diffusing level of moisture in the gas to be measured 30, so that the humidity sensor 422 can be disposed in the sensor chamber Rs adjacent to the linear-shaped second sub-channel 306. In contrast, the flow rate detecting portion 602 requires at least a certain level of flow rate and needs to be kept away from the dust or contamination objects. Further, the influence of pulsation should also be considered. Therefore, the flow rate detecting portion 602 is provided in the first sub-channel 305 extending in a looping manner.

Figure 4A:
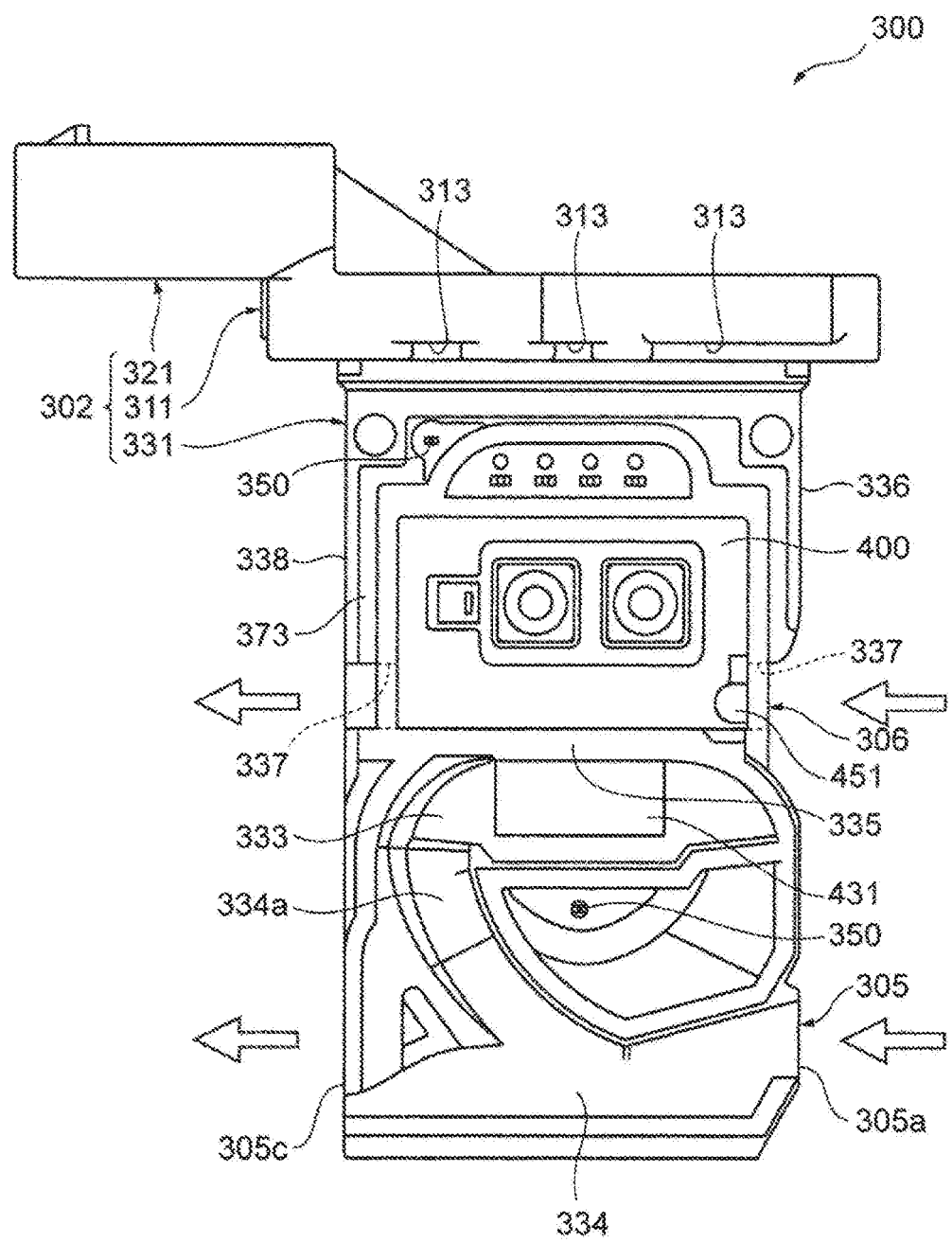
FIG. 4A is a rear view for explaining another embodiment of a housing.
Figure 4B:
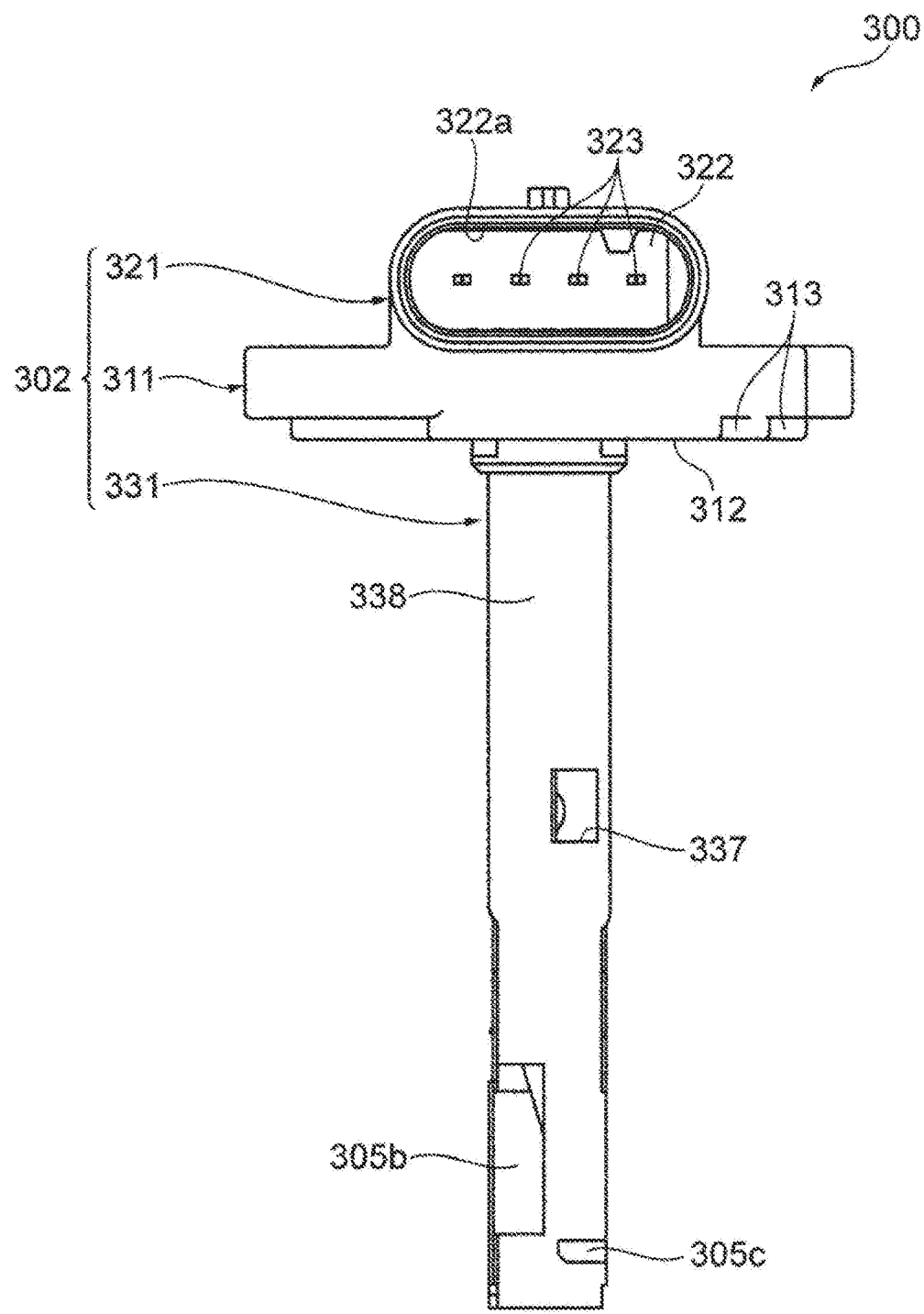
FIG. 4B is a right side view of the housing illustrated in FIG. 4A.

FIGS. 4A and 4B illustrate another embodiment of the second sub-channel.

In this embodiment, a through hole 337 is formed in the upstream-side and downstream-side outer walls 336 and 338, instead of notching the upstream-side and downstream-side outer walls 336 and 338, to form the second sub-channel inlet and outlet 306a and 306b. When the second sub-channel inlet and outlet 306a and 306b are formed by notching the upstream-side and downstream-side outer walls 336 and 338, respectively, as in the second sub-channel illustrated in FIGS. 3B to 3E, the widths of the notched portions of the upstream-side and downstream-side outer walls 336 and 338 are locally narrowed. Accordingly, sinks occur by heat during molding and the measuring portion 331 is deformed and recessed in an approximately dogleg shape starting from the notched portions. In the present embodiment, the through hole is provided instead of notches, so that the bending of the measuring portion 331 in an approximately dogleg shape can be prevented. Thus, the detection accuracy is not affected by the change of position or orientation of the detecting portion relative to the gas to be measured 30 caused by the deformation of the housing 302. This achieves a constantly fixed detection accuracy to be achieved without individual difference.

3.4 Shape and Effect of Front Cover 303 and Rear Cover 304

Figure 5A:
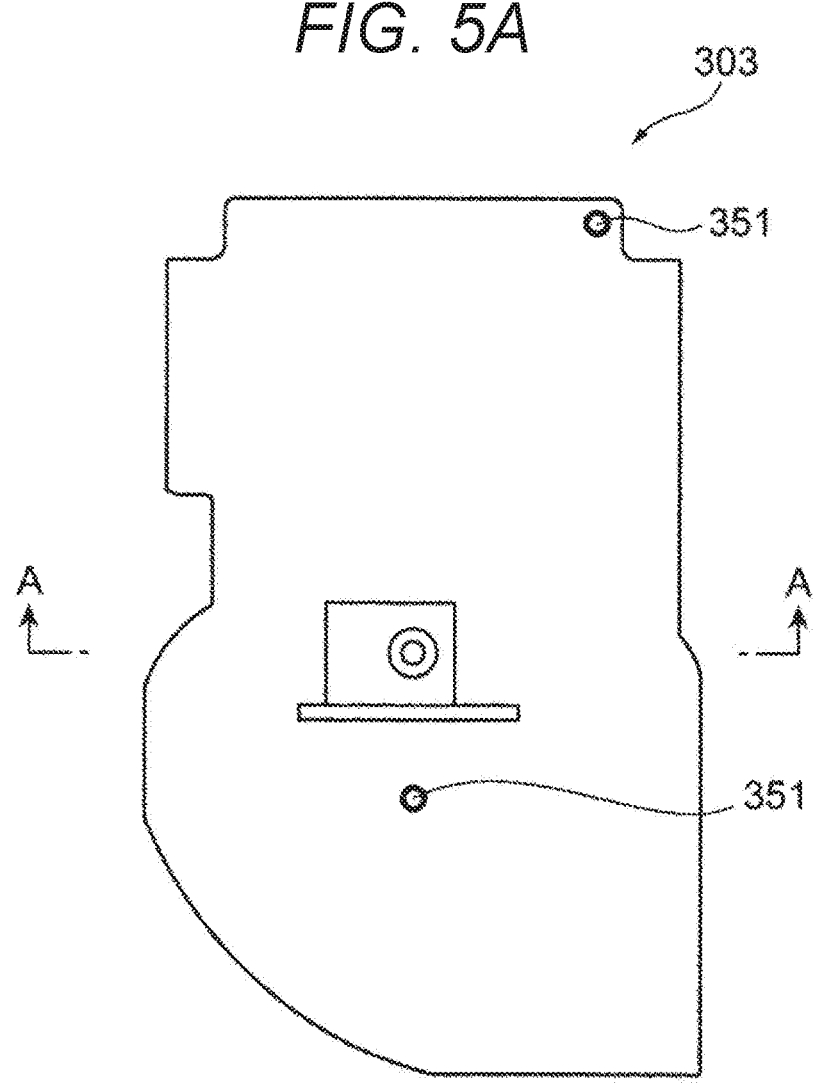
FIGS. 5A and 5B are views explaining the structure of a front cover.
Figure 5B:
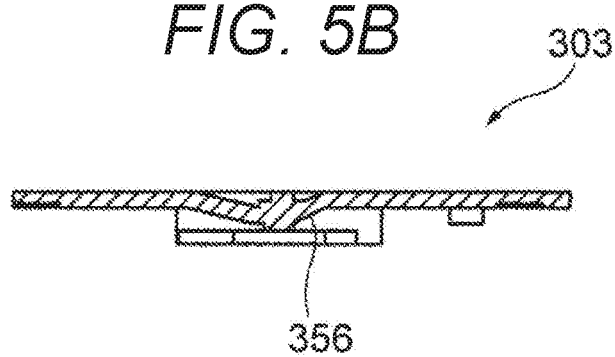
Figure 6A:
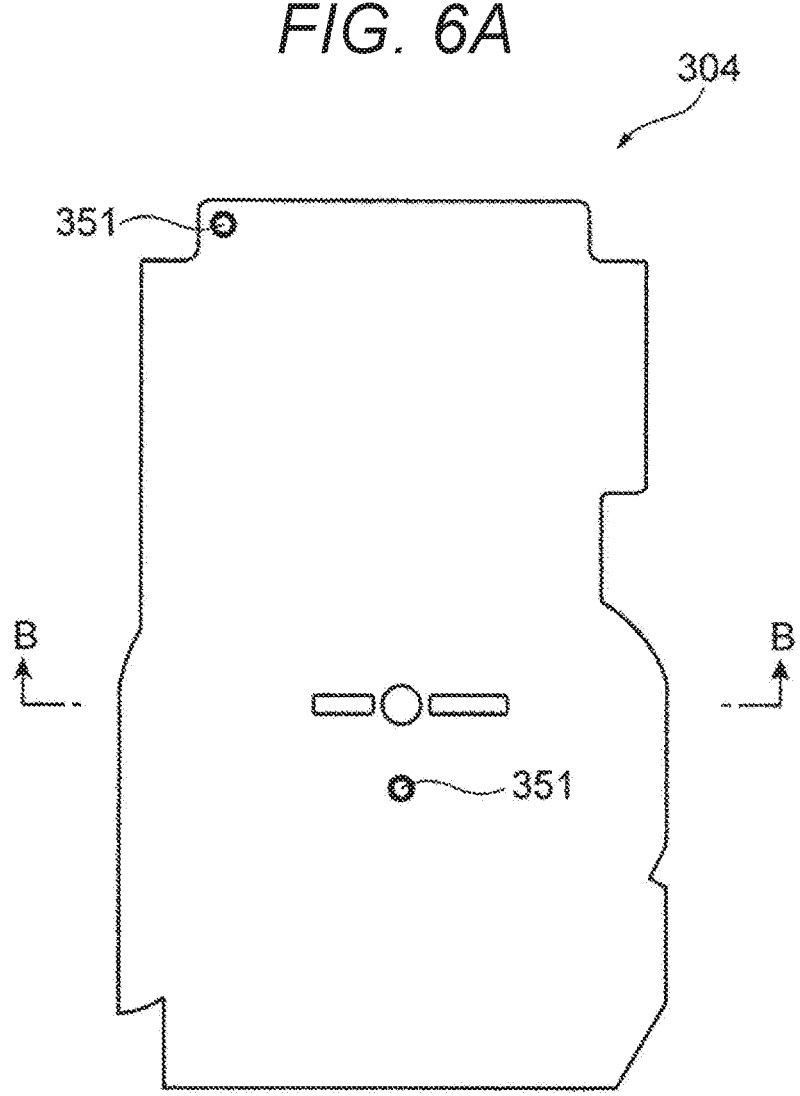
FIGS. 6A and 6B are views explaining the structure of a rear cover.
Figure 6B:

FIGS. 5A and 5B illustrate an external appearance of the front cover 303, in which FIG. 5A is a front view and FIG. 5B is a cross-sectional view of FIG. 5A along line B-B. FIGS. 6A and 6B illustrate an external appearance of the rear cover 304, in which FIG. 6A is a front view and FIG. 6B is a cross-sectional view of FIG. 6A along line B-B.

In FIGS. 5 and 6, the front and rear covers 303 and 304 form the first sub-channel 305 by closing the front-side and the rear-side sub-channels 332 and 334 of the housing 302. The front cover 303 forms the circuit chamber Rc. The rear cover 304 closes the recess of the rear side of the measuring portion 331 to form the second sub-channel 306 and the sensor chamber Rs that communicates with the second sub-channel 306.

The front cover 303 has a projection 356 at a position facing the flow rate detecting portion 602 to form a diaphragm between the front cover 303 and the flow channel surface for measurement 430. Therefore, high molding accuracy is desired. The front and rear covers 303 and 304 can be fabricated with high molding accuracy by resin molding by injecting a thermoplastic resin in a mold.

The front and rear covers 303 and 304 each include a plurality of fixed holes 351 to which a plurality of fixing pins 350 projecting from the measuring portion 331 are inserted. The front and rear covers 303 and 304 are attached to the front surface and the rear surface, respectively, of the measuring portion 331 and, at this time, the fixing pins 350 are inserted into the fixed holes 351 for determining positions. The front and rear covers 303 and 304 are then bonded by, for example, laser welding along the edges of the front-side and rear-side sub-channel grooves 332 and 334, while being similarly bonded by, for example, laser welding along the edges of the circuit chamber Rc and the sensor chamber Rs.

3.5 Fixing Structure and Effect of Fixing Circuit Board 400 to Housing 302

Next, how to fix the circuit board 400 to the housing 302 by the resin molding process is described. The circuit board 400 is and the housing 302 are integrally formed by molding such that the flow rate detecting portion 602 of the circuit board 400 is disposed at a predetermined position of the sub-channel grooves forming the sub-channels. For example, in the present embodiment, the predetermined position is an opening 333 which is a connecting portion between the front-side and rear-side sub-channel grooves 332 and 334.

The measuring portion 331 of the housing 302 includes fixing portions 372 and 373 which are used for burying and fixing the outer peripheries of the base portion 402 of the circuit board 400 in the housing 302 by resin molding. The fixing portions 372 and 373 fix the circuit board 400 by sandwiching the outer peripheries of the base portion 402 from the front side and the rear side.

The housing 302 is fabricated by resin molding. By resin molding, the circuit board 400 is placed inside the resin of the housing 302 so as to fix the circuit board 400 in the housing 302 by resin molding. This achieves very high accuracy in maintaining the positional or directional relationship of the sub-channel for measuring the flow rate by the flow rate detecting portion 602 by transferring heat relative to the gas to be measured 30. For example, the shape of the front-side and rear-side sub-channel grooves 332 and 334 is maintained with very high accuracy. Further, an error or variation generated for each circuit board 400 can be decreased to a very small value. As a result, the measurement accuracy of the circuit board 400 can be largely improved. For example, the measurement accuracy can be improved remarkably when compared to the past fixing method using adhesives.

The physical quantity detector 300 is usually produced by mass-production, so that there is a limit in improving the measurement accuracy in the adhesive method with adhesives while carrying out strict measurement. However, the present embodiment forms the sub-channel and fixes the circuit board 400 simultaneously by resin molding used to form the sub-channel through which the gas to be measured 30 flows. This largely decreases the variation of the measurement accuracy, and largely increases the measurement accuracy of each physical quantity detector 300.

This is described in detail by referring to FIGS. 3A to 3E, for example. The circuit board 400 can be fixed on the housing 302 with high accuracy so as to achieve a prescribed relationship between the front-side and rear-side sub-channel grooves 332 and 334 and the flow rate detecting portion 602. Thus, the relationship in position or shape of the flow rate detecting portion 602 relative to the first sub-channel 305 of the circuit board 400 can be obtained steadily with very high accuracy for each physical quantity detector 300 during mass-production.

In the first sub-channel 305 in which the flow rate detecting portion 602 of the circuit board 400 is fixedly disposed, the front-side and rear-side sub-channel grooves 332 and 334, for example, can be formed with very high accuracy. Therefore, the first sub-channel 305 is formed by these sub-channel grooves 332 and 334 by covering both sides of the housing 302 with the front and rear covers 303 and 304. Such a process is very simple and includes few factors to decrease the measurement accuracy. The front and rear covers 303 and 304 are manufactured by resin molding having high molding accuracy. This completes the sub-channel having a prescribed relationship with the flow rate detecting portion 602 of the circuit board 400 with high accuracy. Such a method improves the measurement accuracy and achieves high productivity.

In contrast, the thermal-type flowmeter has been manufactured in the past by forming the sub-channel and bonding the sub-channel to the measuring portion with an adhesive. Such a method using the adhesive causes a large variation in thickness of the adhesive and also causes a variation in the adhering position or adhering angle for each product. There is a limit, therefore, to the increase of the measurement accuracy. Increasing the measurement accuracy is further difficult if the process is carried out by mass-production.

The embodiment according to the present invention fixedly dispose the circuit board 400 by resin molding, while using the resin molding to form the sub-channel groove for the first sub-channel 305. This fixes the shape of the sub-channel grooves and fixes the flow rate detecting portion 602 to the sub-channel grooves with very high accuracy.

The portions related to measurement of the flow rate, such as the flow rate detecting portion 602 and the flow channel surface for measurement 430 to which the flow rate detecting portion 602 is attached, are provided on the surface of the circuit board 400. The flow rate detecting portion 602 and the flow channel surface for measurement 430 are exposed from the resin forming the housing 302. In other words, the flow rate detecting portion 602 and the flow channel surface for measurement 430 are not covered by the resin that forms the housing 302. The flow rate detecting portion 602 and the flow channel surface for measurement 430 of the circuit board 400 are continuously used after the resin molding of the housing 302 and used for the flow rate measurement of the physical quantity detector 300. Thus, the measurement accuracy increases.

The embodiment of the present invention forms the circuit board 400 and the housing 302 integrally so as to fix the circuit board 400 to the housing 302 having the first sub-channel 305. Thus, the circuit board 400 can be fixedly attached to the housing 302. In particular, a projecting portion 403 of the circuit board 400 penetrates through the partition wall 335 to project into the first sub-channel 305, so that the first sub-channel 305 and the circuit chamber Rc are fixedly sealed to prevent leakage of the gas to be measured 30 to the circuit chamber Rc from the first sub-channel 305 and also prevent corrosion of circuit components and wiring of the circuit board 400 when exposed to the gas to be measured 30.

4. External Appearance of Circuit Board 400

4.1 Forming Flow Channel Surface for Measurement 430 with Flow Rate Detecting Portion 602

Figure 7A:
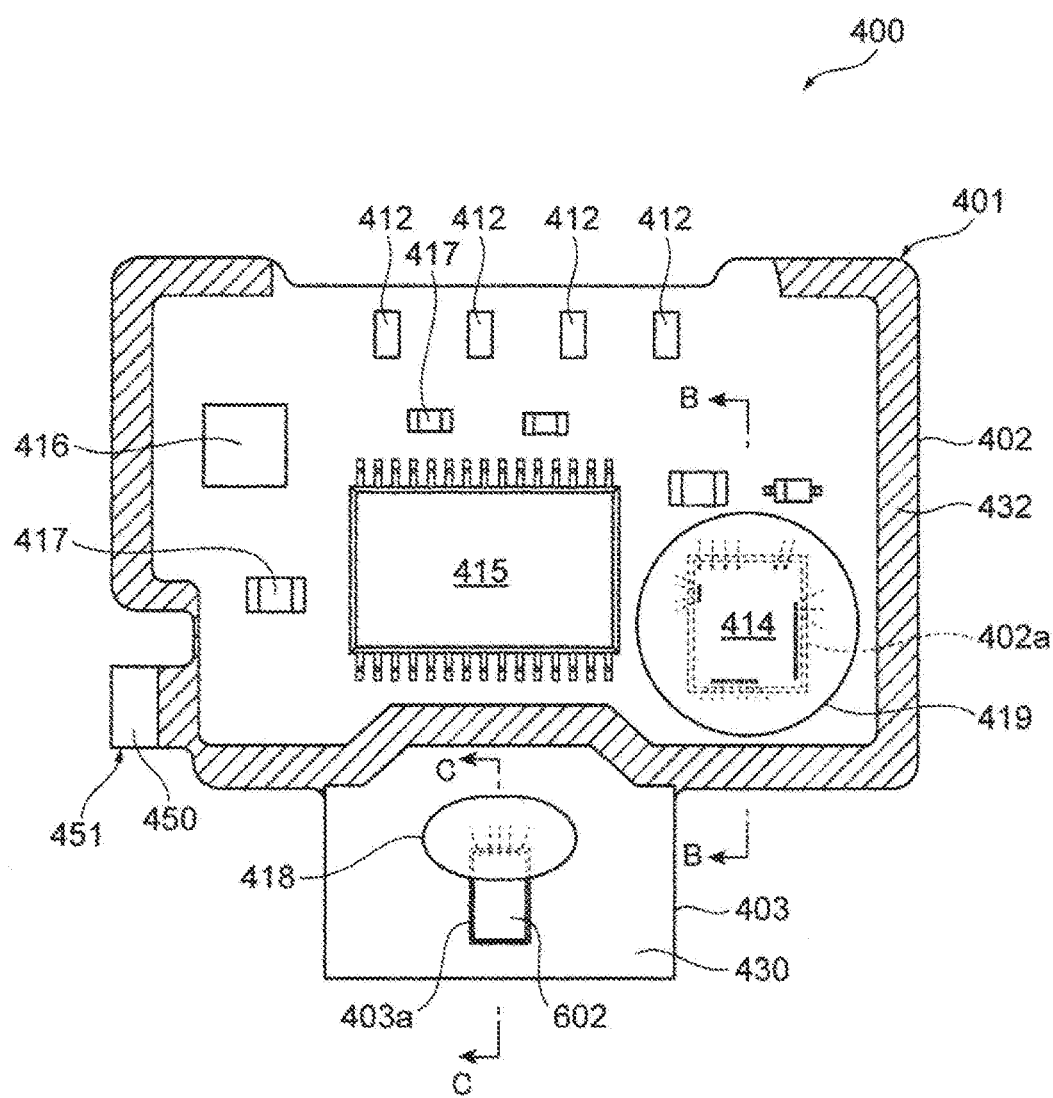
FIG. 7A is a front view of a circuit board.
Figure 7B:
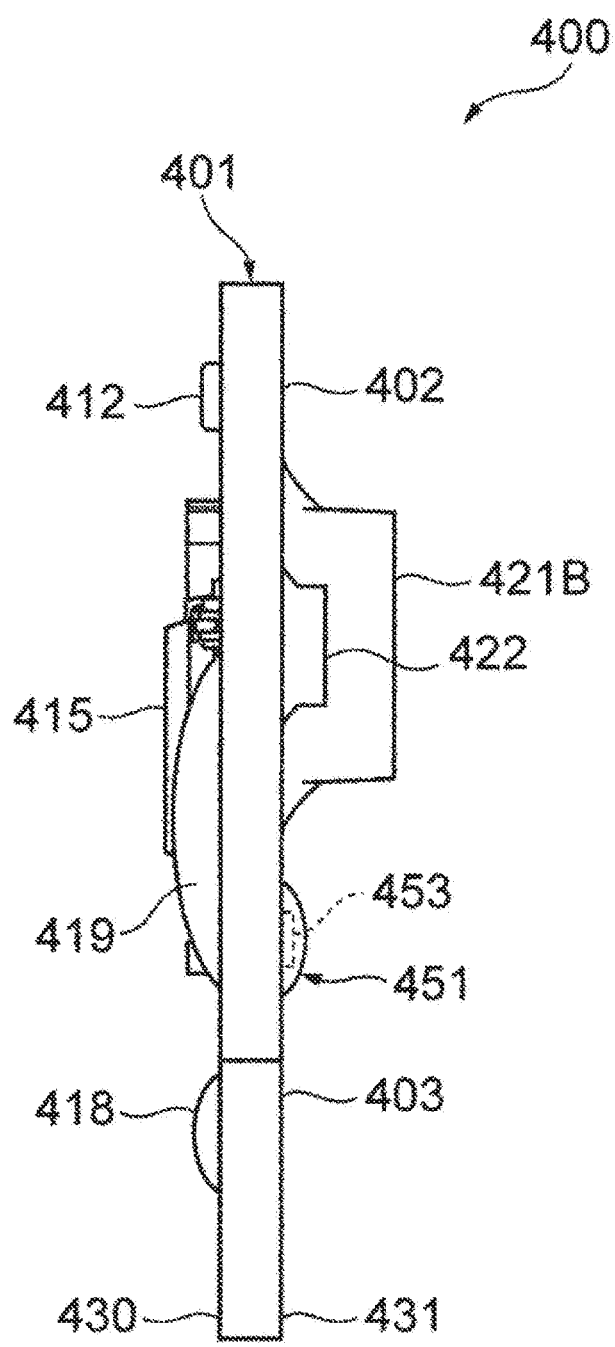
FIG. 7B is a right side view of the circuit board.
Figure 7C:
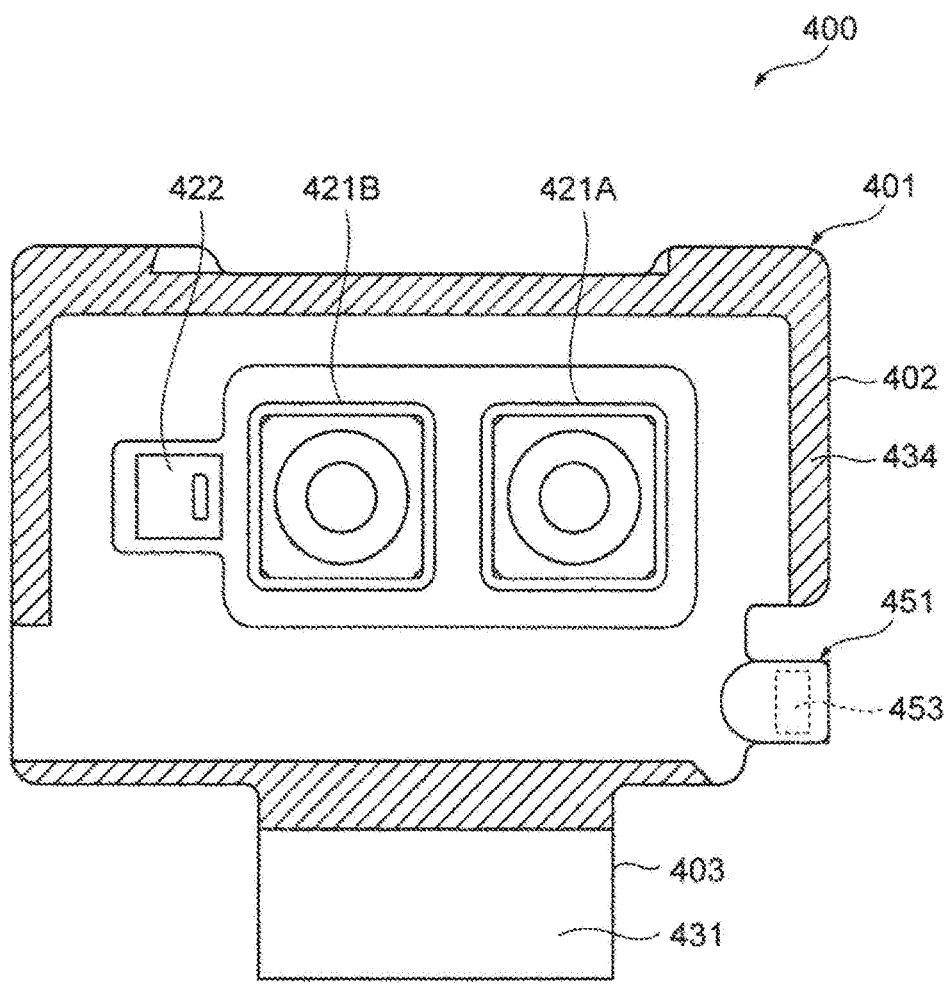
FIG. 7C is a rear view of the circuit board.

FIGS. 7A to 7C illustrate the external appearance of the circuit board 400. Hatching on the external appearance of the circuit board 400 represents fixing surfaces 432 and 434 where the circuit board 400 is covered by resin and fixed when the housing 302 is formed by resin molding.

FIG. 7A is a front view of the circuit board, FIG. 7B is a right side view of the circuit board, and FIG. 7C is a rear view of the circuit board.

The circuit board 400 includes the board body 401. The circuit portion and the flow rate detecting portion 602 functioning as a sensing element are provided on the surface of the board body 401. The pressure sensor 421 and the humidity sensor 422 are provided as sensing elements on the rear surface of the board body 401. The board body 401 is made of a material of a glass epoxy resin having a thermal expansion coefficient similar to that of a thermoplastic resin forming the housing 302, when compared to the board of a ceramic material. Accordingly, when formed in the housing 302 by insert molding, both the stress generated by the difference of the thermal expansion coefficient and the distortion of the circuit board 400 can decrease.

The board body 401 is in a planar shape having a fixed thickness, and includes a base portion 402 having an approximately rectangular shape, and the projecting portion 403 having an approximately rectangular shape which projects from a side of the base portion 402 and has a size smaller than the base portion 402. Thus, the board body 401 is approximately T-shaped in planar view. The circuit portion is provided on the surface of the base portion 402. The circuit portion is formed by mounting electronic components (circuit elements) including an LSI 414, a micon 415, a power supply regulator 416, and chip component 417, such as resistors and capacitors, over the circuit wiring which is not illustrated. The power supply regulator 416 generates more heat than other electronic components such as the micon 415 or the LSI 414, so that the power supply regulator 416 is disposed relatively on the upstream side of the circuit chamber Rc. The LSI 414 is entirely sealed with a synthetic resin material 419 covering gold wires 411 to improve a handling characteristic of the circuit board 400 during insert molding.

A recess 402a to which the LSI 414 is fitted is formed as a recess on the surface of the board body 401. The recess 402a can be formed by laser processing of the board body 401. The board body 401 made of a glass epoxy resin can be processed more easily than the board body made of ceramic, so that the recess 402 can be formed easily. The recess 402 has a depth such that the surface of the LSI 414 is in flush with the surface of the board body 401. By matching the height of the surfaces of the LSI 414 and the board body 401, wire bonding for connecting the LSI 414 and the board body 401 with the gold wires 411 can be carried out easily, and the manufacturing of the circuit board 400 is facilitated. The LSI 414 can be directly provided on the surface of the board body 401. This structure makes the synthetic resin material 419 covering the LSI 414 to project largely, but eliminates the need for processing for forming the recess 402 in the board body 401, so that the manufacturing process is simplified.

The projecting portion 403 is disposed in the first sub-channel 305 when the circuit board 400 is formed by insert molding in the housing 302, so that the flow channel surface for measurement 430, which is a surface of the projecting portion 403, extends along the flowing direction of the gas to be measured 30. The flow rate detecting portion 602 is provided on the flow channel surface for measurement 430 of the projecting portion 403. The flow rate detecting portion 602 transfers heat from the gas to be measured 30 to measure the state of the gas to be measured 30, such as the flow rate, and outputs the electrical signal representing the flow rate flowing in the main channel 124. To measure the state of the gas to be measured 30 with high accuracy by the flow rate detecting portion 602, the gas flowing in the vicinity of the flow channel surface for measurement 430 is desirably a laminar flow with less turbulence. Therefore, the surface of the flow rate detecting portion 602 and the flow channel surface for measurement 430 are desirably in flush with each other or having a difference smaller than a predetermined value.

The recess 403a is formed as a recess on the surface of the flow channel surface for measurement 430, to which the flow rate detecting portion 602 is fitted. The recess 403a can also be formed by laser processing. The recess 403a has a depth so that the surface of the flow rate detecting portion 602 is in flush with the surface of the flow channel surface for measurement 430. The flow rate detecting portion 602 and the wiring portion thereof are covered by a synthetic resin material 418 to prevent electrical corrosion caused by attaching of saline water.

Two pressure sensors 421A and 421B and the single humidity sensor 422 are provided on the rear surface of the board body 401. The two pressure sensors 421A and 421B are arranged in a row and disposed on the upstream side and the downstream side, respectively. The humidity sensor 422 is disposed in the downstream side of the pressure sensor 421B. These two pressure sensors 421A and 421B and the single humidity sensor 422 are disposed in the sensor chamber Rs.

The circuit board 400 includes the second sub-channel 306 disposed on the rear side of the board body 401. Thus, the gas to be measured 30 passing through the second sub-channel 306 can cool the entire board body 401.

4.2 Structure of Temperature Detecting Portion 451

A temperature detecting portion 451 is provided on the end face of the upstream side and at the corner of the projecting portion 403 of the base portion 402. The temperature detecting portion 451 is one of the constituent components of the detecting portion for detecting the physical quantities of the gas to be measured 30 flowing through the main channel 124, and is provided on the circuit board 400. The circuit board 400 includes a projecting portion 450 projecting upstream in the gas to be measured 30 from the second sub-channel inlet 306a of the second sub-channel 306. The temperature detecting portion 451 includes a chip-type temperature sensor 453 provided on the projecting portion 450 and at the rear side of the circuit board 400. The temperature sensor 453 and the wiring portion thereof are covered by the synthetic resin material to protect electrical corrosion due to attaching of saline water.

For example, as illustrated in FIG. 3B, the upstream-side outer wall 336, which forms the housing 302 of the measuring portion 331 in the center portion of the measuring portion 331 where the second sub-channel inlet 306a is provided, is recessed toward the downstream side. From this recessed upstream-side outer wall 336, the projecting portion 450 of the circuit board 400 projects toward the upstream side. The tip end of the projecting portion 450 is located at a position recessed from the most upstream-side surface of the upstream-side outer wall 336. The temperature detecting portion 451 is provided on the projecting portion 450 so as to face the rear side of the circuit board 400, that is, the second sub-channel 306 side.

Since the second sub-channel inlet 306a is formed on the downstream side of the temperature detecting portion 451, the gas to be measured 30 that flows into the second sub-channel 306 from the second sub-channel inlet 306a comes into contact with the temperature detecting portion 451 before flowing into the second sub-channel inlet 306a. This allows detection of temperature during the contact with the temperature detecting portion 451. The gas to be measured 30 that has touched the temperature detecting portion 451 continuously flows into the second sub-channel 306 from the second sub-channel inlet 306a, and passes through the second sub-channel 306 to finally be discharged to the main channel 123 from the second sub-channel outlet 306b.

4.3 Fixing Circuit Board 400 by Resin Molding and Effect Thereof

Hatching of FIG. 7A represents the fixing surfaces 432 and 434 for covering the circuit board 400 with a thermoplastic resin used in resin molding, in order fix the circuit board 400 to the housing 302 during the resin molding. It is important to maintain, with high accuracy, a prescribed relationship of shape between the sub-channel relative to the flow channel surface for measurement 430 and the flow rate detecting portion 602 provided on the flow channel surface for measurement 430.

The sub-channel is formed simultaneously with fixing the circuit board 400 on the housing 302 that forms the sub-channel during the resin molding. Thus, the relationship among the sub-channel, the flow channel surface for measurement 430, and the flow rate detecting portion 602 can be maintained with high accuracy. Specifically, the circuit board 400 is fixed on the housing 302 in the resin molding, so that the circuit board 400 can be positioned and fixed with high accuracy in a mold for forming the housing 302 including sub-channels. By pouring the thermoplastic resin at a high temperature into the mold, the sub-channels are formed with high accuracy and the circuit board 400 is fixed with high accuracy. Therefore, an error or variation that would occur for each circuit board 400 can be reduced to a very small value. As a result, the measurement accuracy of the circuit board 400 can be largely improved.

5. Circuit Configuration of Physical Quantity Detector 300

5.1 Overall Circuit Configuration of Physical Quantity Detector 300

Figure 8A:
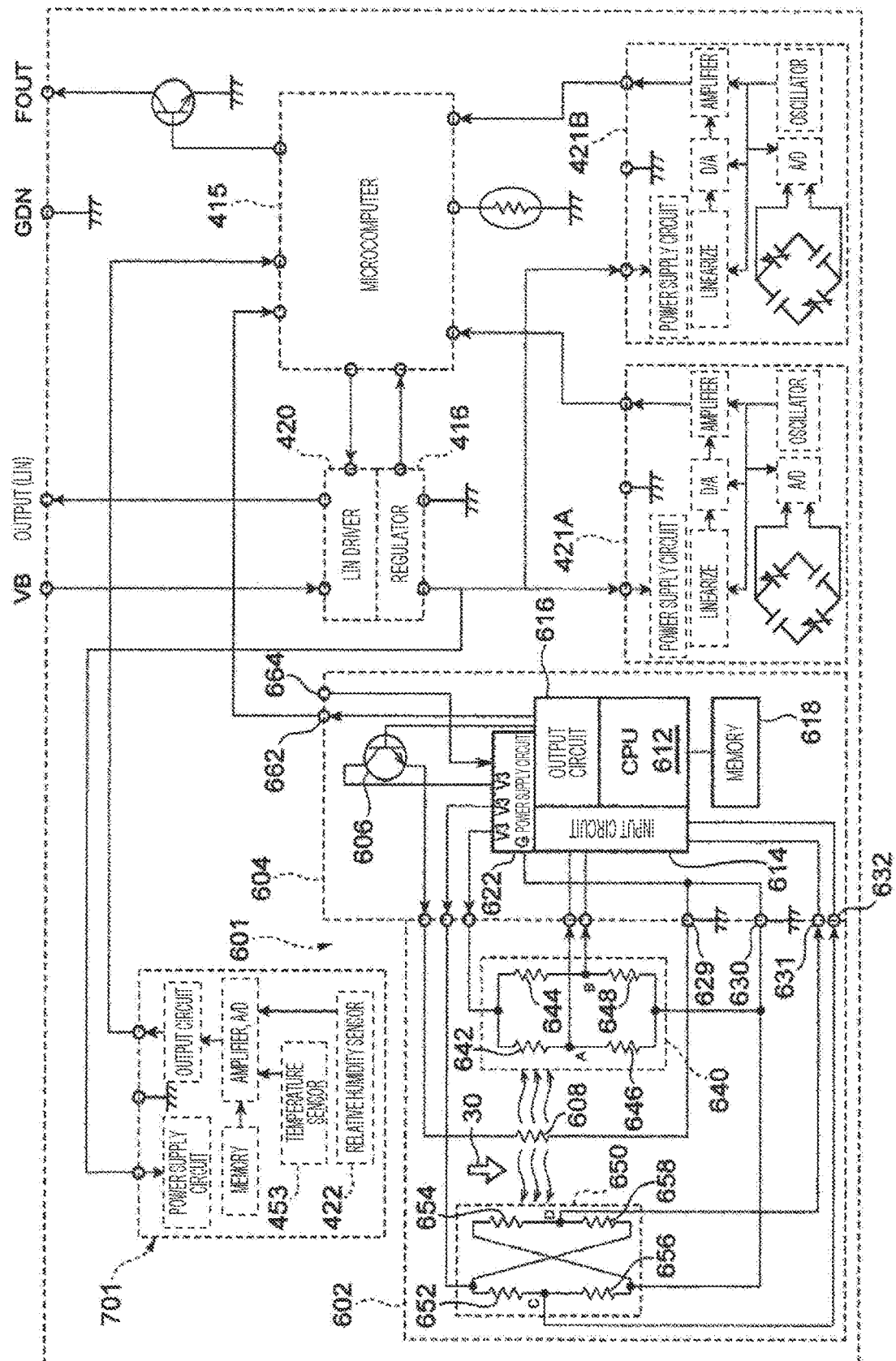
FIG. 8A is an explanatory view of an example circuit configuration of the physical quantity detector.

FIG. 8A is a circuit diagram of the physical quantity detector 300. The physical quantity detector 300 includes a flow rate detecting circuit 601 and a temperature and humidity detecting circuit 701.

The flow rate detecting circuit 601 includes a flow rate detecting portion 602, which includes a heating element 608, and a processing portion 604. The processing portion 604 controls the amount of heat generated by the heating element 608 of the flow rate detecting portion 602, and outputs a signal representing the flow rate in accordance with the output of the flow rate detecting portion 602 to the micon 415 via a terminal 662. To carry out this processing, the processing portion 604 includes a central processing unit (hereinafter referred to as CPU) 612, an input circuit 614, an output circuit 616, a memory 618 that holds correction values and data representing the relationship between measured values and flow rate, and a power supply circuit 622 that supplies a fixed voltage to individual circuits in need of the fixed voltage. The power supply circuit 622 receives a direct current power via a terminal 664 and a ground terminal which is not illustrated from an external power supply such as an in-vehicle battery.

The flow rate detecting portion 602 includes the heating element 608 for heating the gas to be measured 30. A voltage V1 is supplied from the power supply circuit 622 to a collector of a transistor 606 which forms a current supply circuit for the heating element 608. A control signal is applied to a base of the transistor 606 from the CPU 612 via the output circuit 616. An electric current is supplied to the heating element 608 from the transistor 606 via a terminal 624 in accordance with the control signal. An amount of the electric current supplied to the heating element 608 is controlled by a control signal applied to the transistor 606 that forms the current supply circuit for the heating element 608 from the CPU 612 via the output circuit 616. The processing portion 604 controls the amount of heat of the heating element 608 such that the gas to be measured 30 is heated by the heating element 608 to raise the temperature from the initial temperature by predetermined degrees, e.g., 100° C.

The flow rate detecting portion 602 includes a heating control bridge 640 for controlling the amount of heat of the heating element 608 and a flow rate detecting bridge 650 for measuring the flow rate. A fixed voltage V3 is supplied from the power supply circuit 622 to one end of the heating control bridge 640 via a terminal 626. The other end of the heating control bridge 640 is connected to a ground terminal 630. A fixed voltage V2 is supplied from the power supply circuit 622 to one end of the flow rate detecting bridge 650 via a terminal 625. The other end of the flow rate detecting bridge 650 is connected to the ground terminal 630.

The heating control bridge 640 has a resistor 642 which is a temperature measuring resistor whose resistance value changes in accordance with the temperature of the heated gas to be measured 30. Resistors 642 and 644 and resistors 646 and 648 form bridge circuits. A potential difference between anode A of the resistors 642 and 646 and a node B of the resistors 644 and 648 is applied to the input circuit 614 via terminals 627 and 628. The CPU 612 controls the electric current supplied from the transistor 606 such that the potential difference between the nodes A and B is at a predetermined value, e.g., zero volt in the present embodiment, and then controls the amount of heat of the heating element 608. The flow rate detecting circuit 601 illustrated in FIG. 8A heats the gas to be measured 30 by the heating element 608 such that the temperature of the gas to be measured 30 is always higher by fixed degrees, for example, 100° C. higher than the initial temperature of the gas to be measured 30. To carry out such a heating control with high accuracy, the resistance values of the individual resistors that form the heating control bridge 640 are set such that the potential difference between the nodes A and B is zero volt when the temperature of the gas to be measured 30 heated by the heating element 608 becomes always higher by a fixed temperature, for example, 100° C. higher than the initial temperature. In the flow rate detecting circuit 601, the CPU 612 thus controls the supply current to the heating element 608 such that the potential difference between the nodes A and B is zero volt.

The flow rate detecting bridge 650 is formed by four temperature measuring resistors including resistors 652, 654, 656, and 658. These four temperature measuring resistors are arranged along the flow of the gas to be measured 30. The resistors 652 and 654 are arranged on the upstream side of heating element 608 in the flow channel of the gas to be measured 30. The resistors 656 and 658 are arranged on the downstream side of the heating element 608 in the flow channel of the gas to be measured 30. To increase the measurement accuracy, the resistors 652 and 654 are arranged so that a distance between the resistor 652 and the heating element 608 and a distance between the resistor 654 and the heating element 608 are approximately equal, and that a distance between the resistor 656 and the heating element 608 and a distance between the resistor 658 and the heating element 608 are approximately equal.

A potential difference between the node C which is the intersection of the resistors 652 and 656 and the node D which is the intersection of the resistors 654 and 658 are input to the input circuit 614 via the terminals 631 and 632. To increase measurement accuracy, the resistors of the flow rate detecting bridge 650 are set such that the potential difference between the nodes C and D is zero, for example, when the flow of gas to be measured 30 is zero. When the potential difference between the nodes C and D is zero, for example, the CPU 612 outputs an electrical signal indicating that the flow rate in the main channel 124 is zero from the terminal 662 in accordance with the measurement result of zero flow rate of the gas to be measured 30.

When the gas to be measured 30 flows along the arrow illustrated in FIG. 8A, the resistors 652 and 654 arranged on the upstream side are cooled by the gas to be measured 30. The resistors 656 and 658 arranged on the downstream side of the gas to be measured 30 are warmed by the gas to be measured 30 that has been warmed by the heating element 608, so that the temperatures of the resistors 656 and 658 are raised. This generates the potential difference between the nodes C and D of the flow rate detecting bridge 650, and this potential difference is input to the input circuit 614 via the terminals 631 and 632. The CPU 612 searches for the data representing the relationship between the potential difference and the flow rate of the main channel 124 stored in the memory 618, in accordance with the potential difference between the nodes C and D of the flow rate detecting bridge 650, and determines the flow rate of the main channel 124. Thus, the flow rate of the main channel 124 is determined and an electrical signal representing the flow rate is output via the terminal 662. In FIG. 8A, the terminals 664 and 662 are indicated by new reference numbers, but are identical to those included in the connection terminals 412 illustrated in FIG. 7A described above.

The memory 618 stores the data representing the relationship between the potential difference of the nodes C and D and the flow rate of the main channel 124. The memory 618 also stores correction data for decreasing measurement errors such as variations, which is required in accordance with the actual measurement value of the gas, after the production of the circuit board 400.

The temperature and humidity detecting circuit 701 includes an input circuit such as an amplifier and A/D to which detection signals from the temperature sensor 453 and the humidity sensor 422 are input, an output circuit, a memory holding the data representing the correction values and the relationship between temperature and absolute humidity, and a power supply circuit 622 that supplies a fixed voltage to individual circuits in need of the fixed voltage. Signals output from the flow rate detecting circuit 601 and the temperature and humidity detecting circuit 701 are input to the micon 415. The micon 415 includes a flow rate calculating portion, a temperature calculating portion, and an absolute humidity calculating portion. The micon 415 calculates the physical quantities of the gas to be measured 30 including flow rate, temperature, and absolute humidity in accordance with the signal, and outputs the calculated quantities to the ECU 200.

The physical quantity detector 300 and the ECU 200 are connected by a communication cable to allow communication using digital signals according to communication standards, such as SENT, LIN, or CAN. In the present embodiment, a signal is input from the micon 415 to a LIN driver 420 where LIN communication is carried out from the LIN driver 420. Information output from the LIN driver of the physical quantity detector 300 to the ECU 200 is output in such a manner that the information is multilayered by digital communication using a single or two-line communication cable.

The absolute humidity calculating portion of the micon 415 calculates an absolute humidity in accordance with the information of the relative humidity output from the humidity sensor 422 and the temperature information, and corrects the absolute humidity according to an error. The corrected absolute humidity calculated by the absolute humidity calculating portion is used in controlling various operations of the engine by a controller 62 of an ECU 18. The ECU 18 can also use the information of a total error directly in controlling various operations of the engine.

Figure 8B:
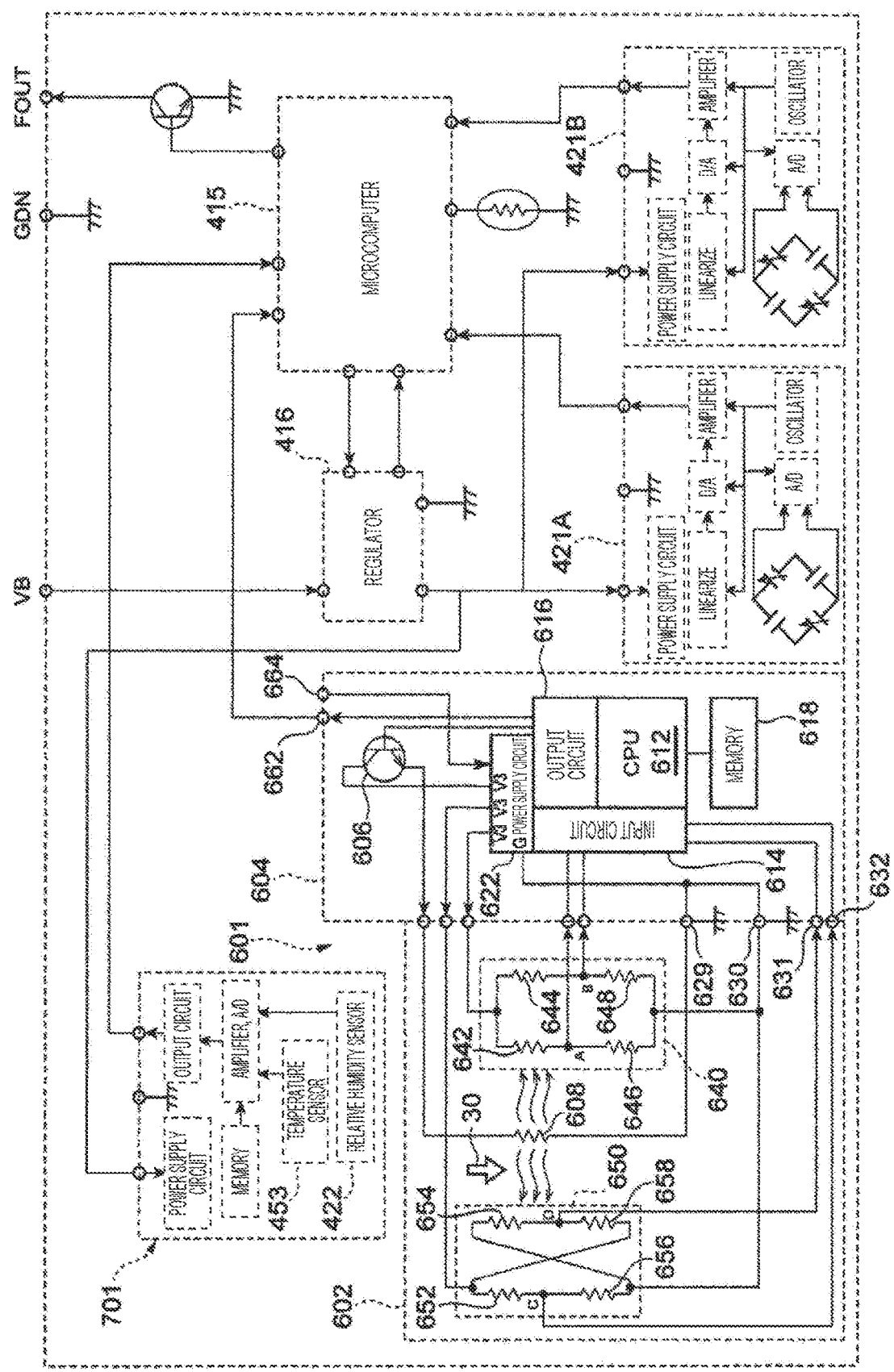
FIG. 8B is an explanatory view of another example circuit configuration of the physical quantity detector.

In the embodiment of FIG. 8A, the physical quantity detector 300 includes the LIN driver 420 for carrying out the LIN communication, but other embodiments are also possible and the physical quantity detector 300 may directly communicate with the micon 415 without carrying out the LIN communication, as illustrated in FIG. 8B.

6. Structure of Circuit Board 400

Figure 9A:
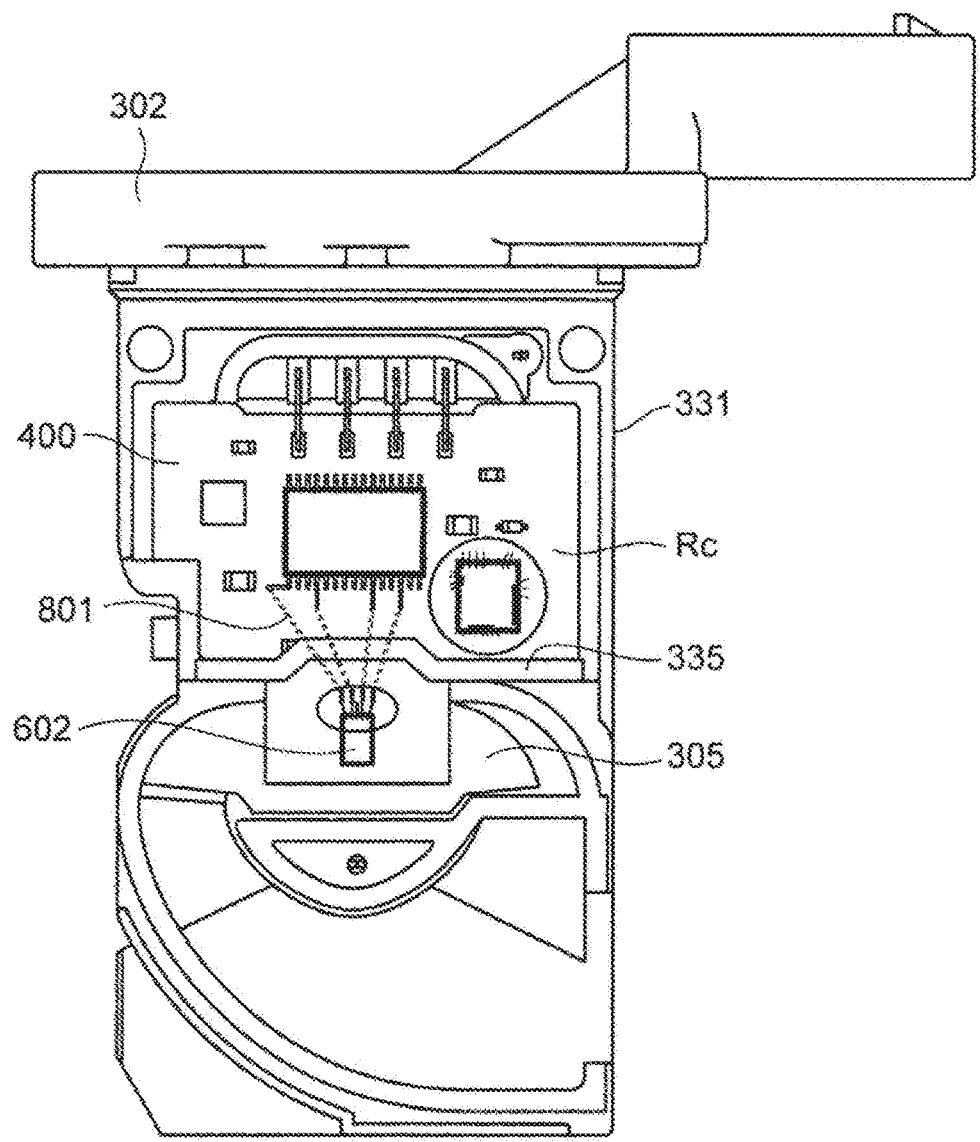
FIG. 9A is a front view of the state of the housing when the front cover is removed from the physical quantity detector.
Figure 9B:
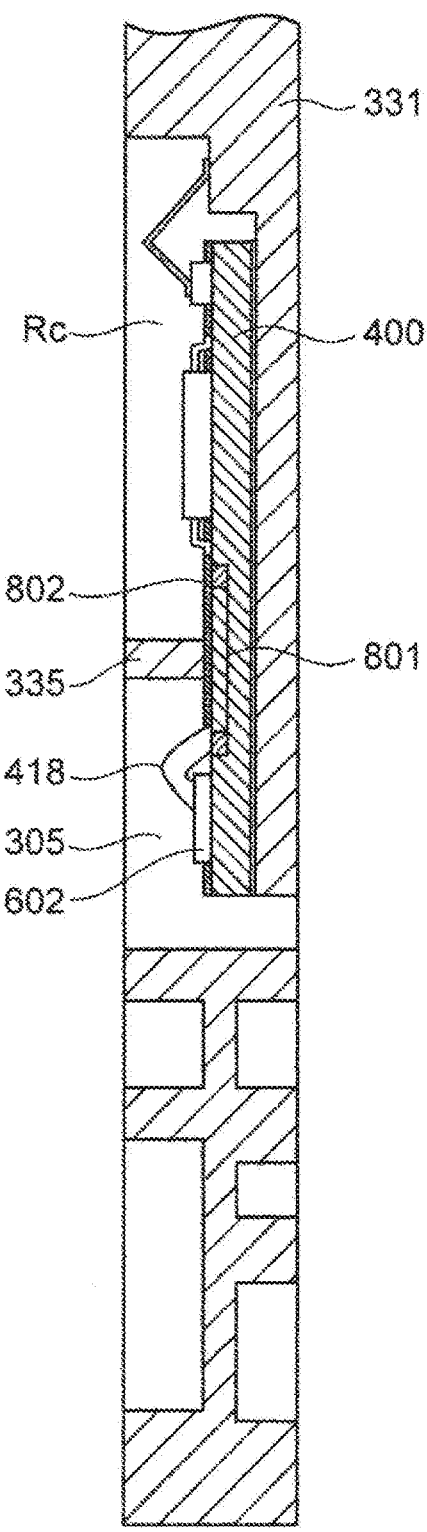
FIG. 9B is a cross-sectional view of FIG. 9A.

FIG. 9A illustrates a front view of the housing 302 when the front cover 303 is removed from the physical quantity detector 300. FIG. 9B is a cross-sectional view of FIG. 9A.

To seal the circuit chamber Rc and expose the flow rate detecting portion 602 in the first sub-channel 305, the circuit board 400 is partitioned by the partition wall 335 provided between the circuit chamber Rc of the measuring portion 331 and the first sub-channel 305. The circuit in the circuit chamber Rc is electrically connected to the flow rate detecting portion 602 that is mounted so as to be exposed in the first sub-channel 305 by inner layer conductors 801 of the circuit board 400. Typically, it is efficient to arrange wire connection on the surface layer, but if the wire connection is provided on the surface of the surface layer of the circuit board 400 to which the partition wall 335 touches, a load would be applied during assembly of the partition wall 335 to probably damage the surface layer conductors and a coating 802 that protects the surface layer conductors. Further, a risk of the damage is higher when the surface layer conductors are disposed under the partition wall 335, because irregularities of the surface occurs between an area with the surface layer conductors and an area without the surface layer conductors. In contrast, the electric connection is provided by inner layer conductors 801 in the embodiment of the present invention, so that the risk of the damage is low and the reliability as a commercial product can be improved. The inner layer conductors 801 are disposed on the inner layer of the circuit board 400 where the partition wall 335 is located, and electrically connect the flow rate detecting portion 602 (sensor portion) to the circuit (circuit portion) in the circuit chamber Rc.

Figure 9C:
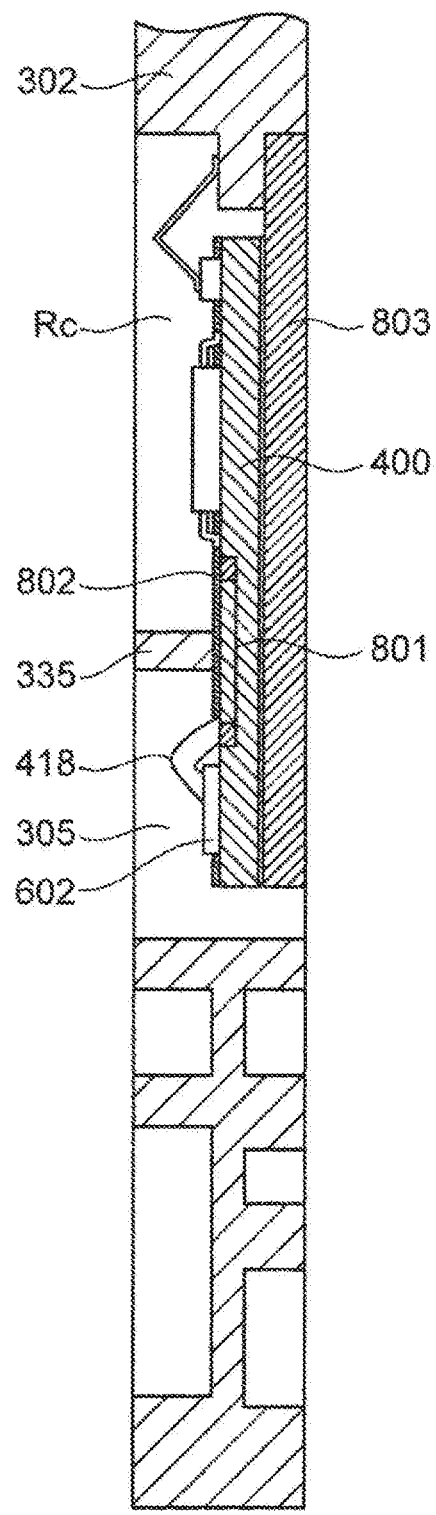
FIG. 9C is a cross-sectional view of the housing when the front and rear covers are removed from the physical quantity detector.

FIG. 9C is a cross-sectional view of the housing 302 when the front and rear covers 303 and 304 are removed from the physical quantity detector 300, thus illustrating an example fixing structure of the circuit board 400.

A base 803 is provided for the housing 302 for holding the circuit board 400. The circuit board 400 is adhesively fixed to the base 803 holding the circuit board 400. The partition wall 335 is integrally provided with the housing 302. When the partition wall 335 is made of the same molding resin used to form the housing 302, it is possible to form the housing 302 integrally with connectors.

Figure 9D:
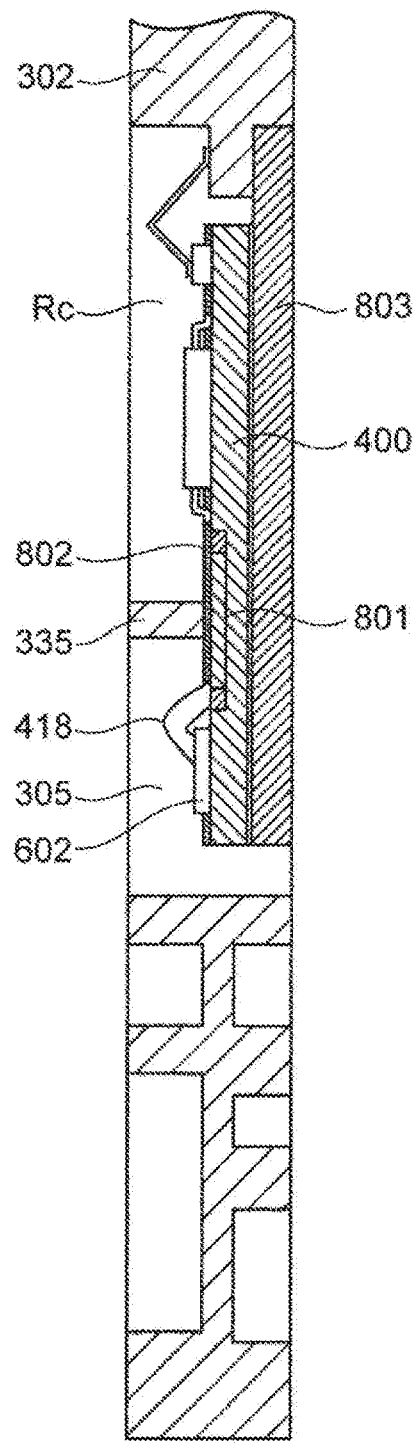
FIG. 9D is a cross-sectional view of the housing when the front and rear covers are removed from the physical quantity detector.

FIG. 9D is a cross-sectional view of the housing 302 when the front and rear covers 303 and 304 are removed from the physical quantity detector 300, thus illustrating an example structure of the circuit board 400.

The circuit board 400 is made of a glass epoxy substrate. The base material of the ceramic substrate is inherently brittle. The coating for protecting the circuit conductors is also brittle because a glass-based material is often used for the coating. Thus, breakage easily occurs when adhesively fixing the partition wall 335 and the housing 302. The glass epoxy substrate is made of fabric produced by weaving glass fibers and solidifying the fabric with epoxy resin. The coating for protecting the circuit conductors is also made of an epoxy resin-based material. Thus, the circuit board 400 is hardly broken compared to the ceramic substrate even when the partition wall 335 and the housing 302 are adhesively fixed.

Figure 9E:
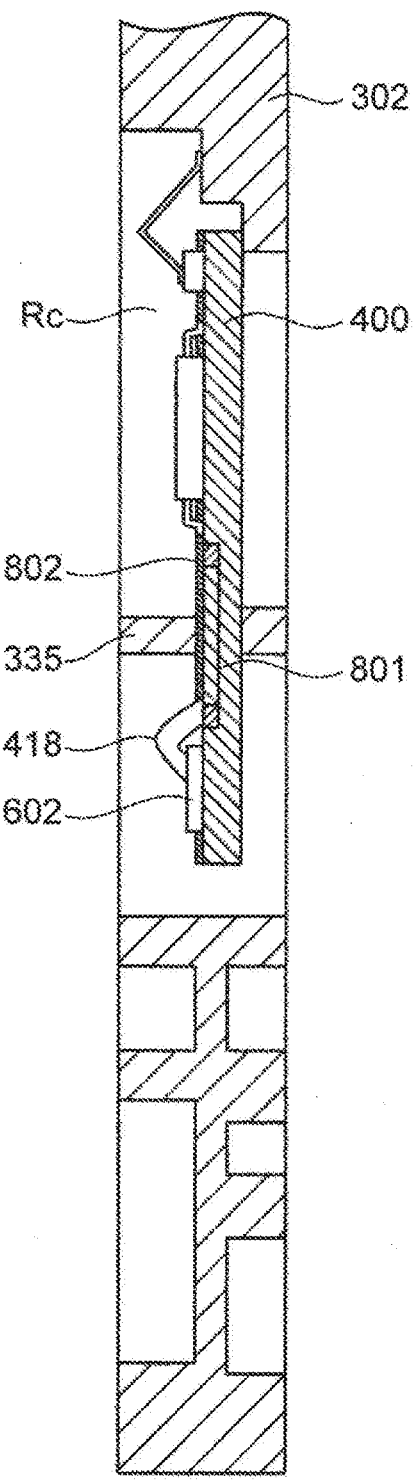
FIG. 9E is a cross-sectional view of the housing when the front and rear covers are removed from the physical quantity detector.

FIG. 9E is a cross-sectional view of the housing 302 when the front and rear covers 303 and 304 are removed from the physical quantity detector 300, thus illustrating an example fixing structure of the circuit board 400.

Figure 9F:
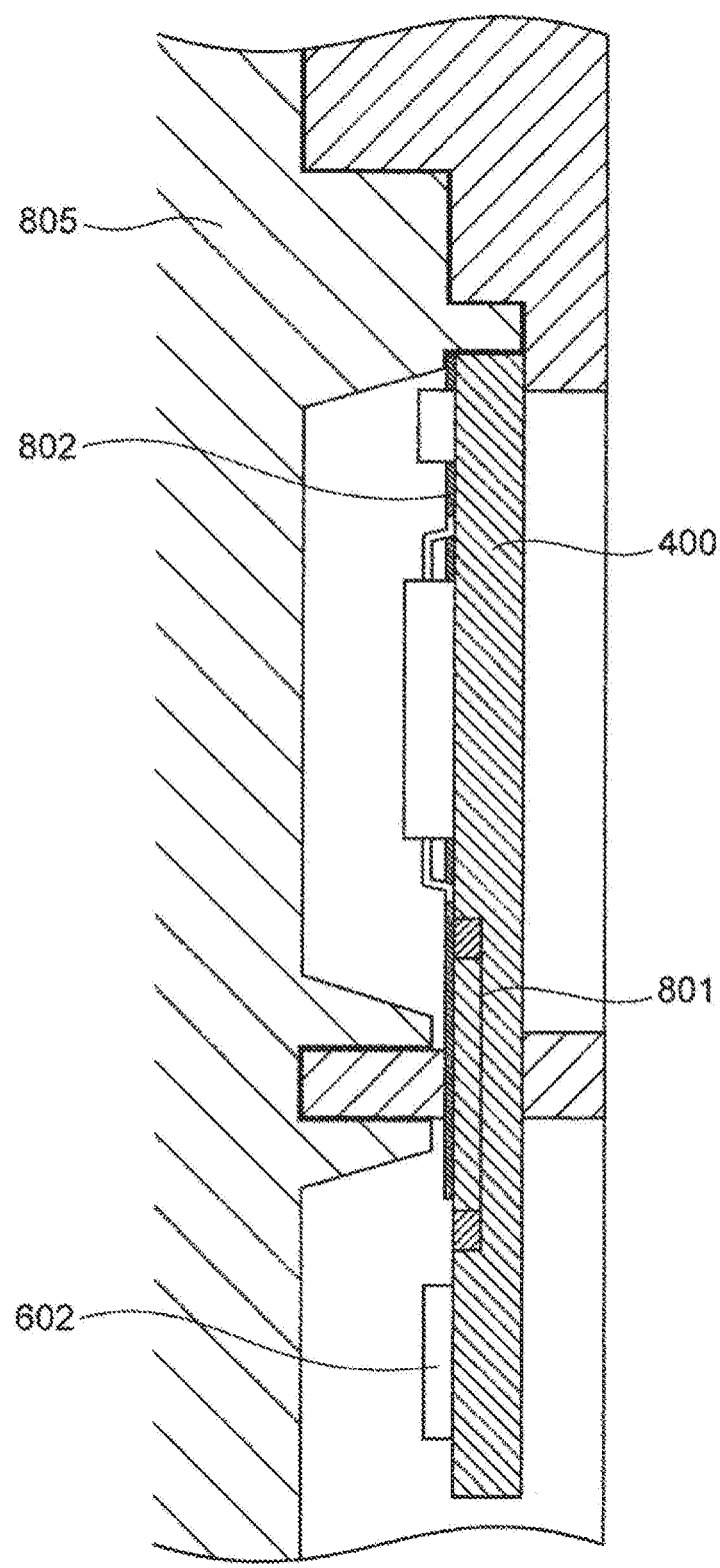
FIG. 9F is a view for explaining insert molding of the circuit board with a molding resin.

The circuit board 400 is formed by insert molding with the same molding resin as used for forming the housing 302. In insert molding with the molding resin, as illustrated in FIG. 9F, a mold 805 for forming the housing 302 impinges on the circuit board 400. To prevent leakage of the resin during molding of the housing 302, the mold 805 is either made to touch the circuit board 400 or controlled to have a gap that does not allow leakage of the resin during molding.

A push-in amount of the mold 805 may increase depending on a variation in thickness of the circuit board 400 or a variation of settings of the mold 805, so that a large stress would be applied to the circuit board 400. In this case, the ceramic substrate is brittle and generates a crack. In contrast, the coating 802 for protecting the surface layer conductors and the base material of the glass epoxy substrate is made of resin, preventing cracks.

Meanwhile, the housing 302 made of molding resin generates warp or sink when cooled after molding. When the warp or sink of the molding resin causes a stress to be applied to the circuit board 400, a crack occurs in the brittle ceramic substrate. Again, the glass epoxy substrate also has a strong resistance to the crack caused by the warp of the molding resin.

In addition, a thermal expansion coefficient of the molding resin is small in the ceramic substrate. This causes a large difference in thermal expansion coefficient, generating the crack in the molding resin. The glass epoxy substrate may possibly damage the circuit conductors on the surface layer if the push-in amount of the molding largely exceeds an elastic area, so that the wiring in the inner layer conductors 801 is needed. In particular, the wiring itself may not be necessary on the outer periphery of the substrate, but the wiring for connecting the electronic components of the circuit chamber Rc which is in a sealed state to the flow rate detecting portion 602 which is exposed in the first sub-channel 305 has to pass under the partition wall 335. Thus, the wiring in the inner layer conductors 801 is required in order to prevent the damage of the conductors due to the mold 805.

Figure 9G:
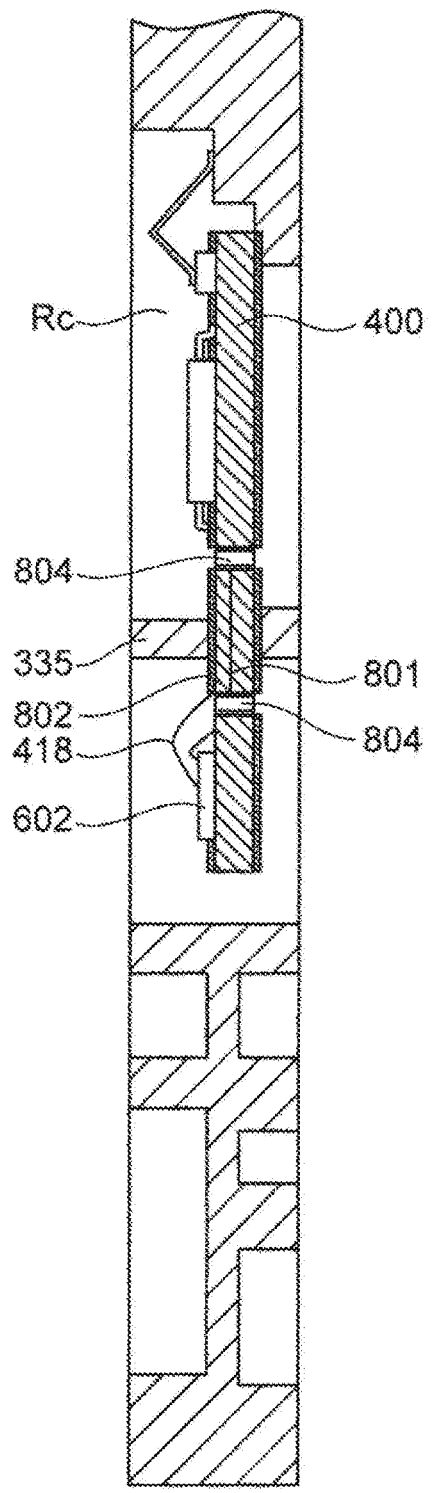
FIG. 9G is a cross-sectional view of the housing when the front and rear covers are removed from the physical quantity detector.

FIG. 9G illustrates a cross-sectional view of the housing 302 when the front and rear covers 303 and 304 are removed from the physical quantity detector 300.

The circuit board 400 includes a through hole 804 that allows electric connection between the electronic components in the circuit chamber Rc and the flow rate detecting portion 602 by the inner layer conductors 801 via the through hole 804. In the case of the circuit board 400 made of the glass epoxy substrate, a through hole substrate in which the through hole is formed after the layers are stacked is inexpensive. Thus, a highly reliable and inexpensive physical quantity detector can be provided.

Figure 9H:
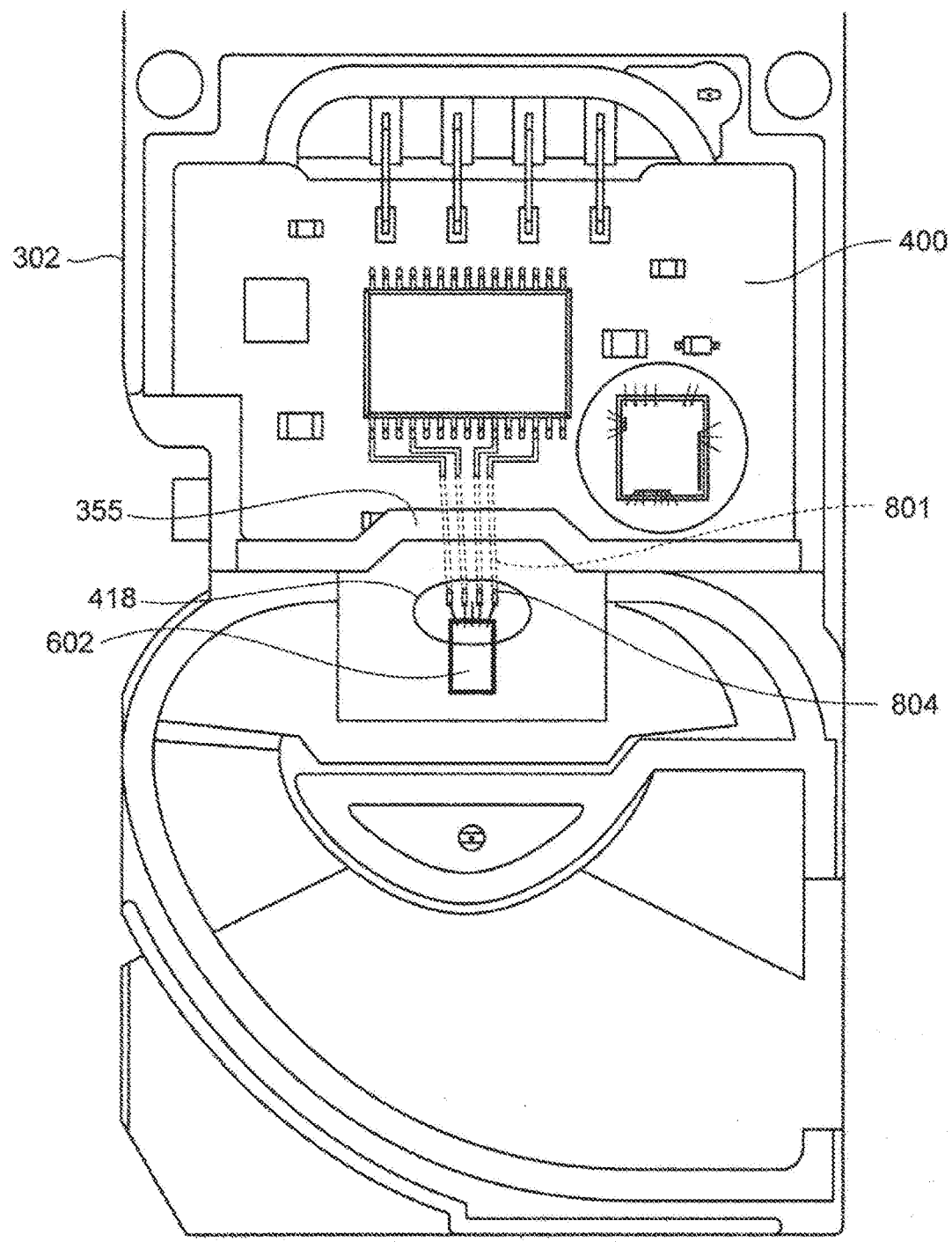
FIG. 9H is a front view of the housing when the front cover is removed from the physical quantity detector.

FIG. 9H illustrates a front view of the housing 302 when the front cover 303 is removed from the physical quantity detector 300.

The through hole 804 of the circuit board 400 is arranged along the partition wall 355. Arranging the through hole 804 along the partition wall 355 decreases the length of wiring between the electronic components in the circuit chamber Rc and the flow rate detecting portion 602, reduces noise of the circuit, decreases impedance, and improves stability of the circuit.

Figure 9I:
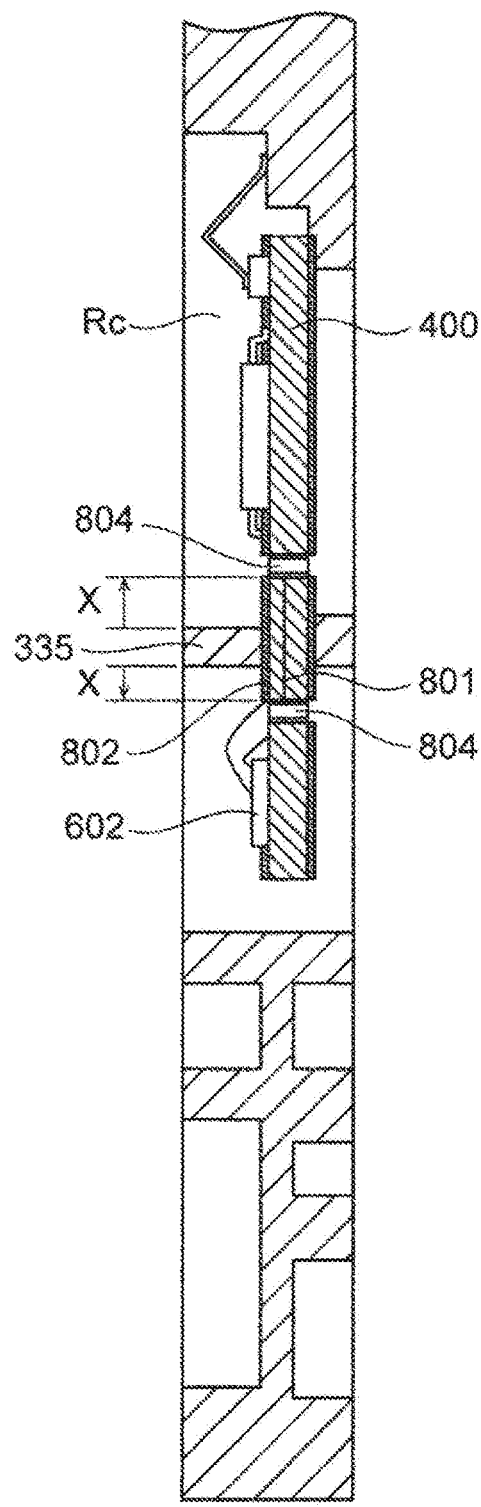
FIG. 9I is a cross-sectional view of the housing when the front and rear covers are removed from the physical quantity detector.

FIG. 9I illustrates a cross-sectional view of the housing 302 when the front and rear covers 303 and 304 are removed from the physical quantity detector 300.

The through hole 804 formed in the circuit board 400 is arranged at a position separated from the partition wall 355 at least by a predetermined distance x. When the housing 302 is formed as illustrated in FIG. 9F, the mold 805 impinges on the circuit board 400 to form the partition wall 335. The through hole 804 is a hollow which is less strong relative to the base material portion of the circuit board 400. When the mold impinges on the through hole 804 and the push-in amount increases, the crack is generated in the through hole 804. To prevent the mold 805 from damaging the through hole 804, the through hole 804 has to be separated from the partition wall 355 at least by a predetermined distance. In the present embodiment, the through hole 804 is located at a position away from the partition wall 355 at least by 1.2 mm.

Figure 9J:
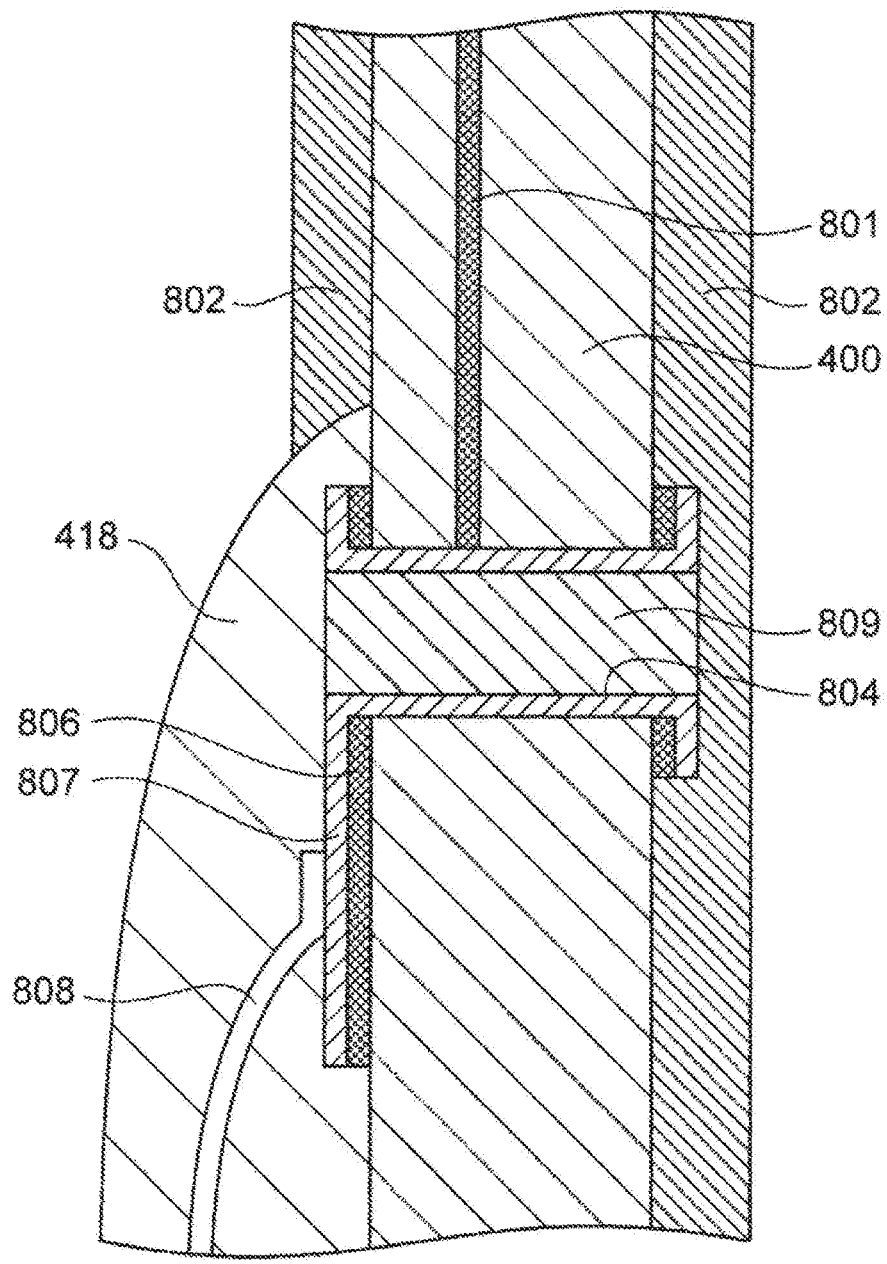
FIG. 9J is a cross-sectional view of housing when the front and rear covers are removed from the physical quantity detector.

FIG. 9J is a cross-sectional view of the housing 302 when the front and rear covers 303 and 304 are removed from the physical quantity detector 300, and illustrates major components in an enlarged manner.

The through hole 804 is plated with gold plating 807 to allow conduction between the inner layer conductors 801 and a surface layer conductor 806. In addition, the through hole 804 that is formed in the circuit board 400 and disposed at least in the vicinity of the partition wall 355 is filled with a filler 809 such as a metal or a resin. The strength of the circuit board 400 increases when the through hole 804 is filled with the metal or resin filler 809 compared to the case where the through hole 804 is hollow. Even when the through hole 804 is arranged in the vicinity of the partition wall 355, the damage of the circuit board 400 at the through hole 804 can be decreased. Further, the through hole 804 filled with the metal or resin filler 809 can prevent the occurrence of the crack in the through hole 804 due to the warp of the housing 302.

In the embodiment described above, the flow rate detecting portion has been descried as a representative example of the element that detects the physical quantities. A similar effect, however, can be obtained using other flow rate detecting elements for the flow rate detecting portion.

While certain embodiments of the present invention have been described, these embodiments are not intended to limit the scope of the invention. Indeed, a variety of design changes may be made without departing from the spirit of the invention defined in the appended claims. For example, the embodiments described above have been described in detail to facilitate understanding of the present invention, and the embodiments are not limited to those including all constituent components described above. Further, the structure of a certain embodiment can be partially replaced by other embodiments, or the structure of other embodiments can be added to the structure of a certain embodiment. Still further, the embodiments can partially be added, deleted, or substituted for by other structures.

REFERENCE SIGNS LIST 30 gas to be measured
124 main channel
300 physical quantity detector
302 housing
400 circuit board
404, 405, 406 through hole
407, 408 notch
421A, 421B pressure sensor (third detecting portion)
422 humidity sensor (second detecting portion)
602 flow rate detecting portion (first detecting portion)

The invention claimed is:

1. A physical quantity detector, comprising:
a circuit board including a sensor portion in which a sensor element for detecting a physical quantity is disposed, and a circuit portion in which a circuit element is disposed; and
a partition wall formed in the housing and that is in contact with the circuit board and is configured to partition the sensor portion and the circuit portion in the circuit board, wherein
the circuit board includes an inner layer conductor that is configured to electrically connect the sensor portion to the circuit portion across a portion between the sensor portion and the circuit portion, in an inner layer of a portion in the circuit board to which the partition wall touches, and
the circuit board is formed by insert molding with the molding resin used for forming the housing, and fixed by the partition wall.

2. The physical quantity detector according to claim 1, wherein
the partition wall is made of a molding resin used for forming a housing.

3. The physical quantity detector according to claim 2, wherein
the circuit board is made of a glass epoxy substrate.

4. The physical quantity detector according to claim 1, wherein
the inner layer conductor is electrically connected via a through hole formed in the board.

5. The physical quantity detector according to claim 4, wherein
the through hole is disposed along the partition wall.

6. The physical quantity detector according to claim 4, wherein
the through hole is provided at a position separated from the partition wall by at least 1.2 mm.

7. The physical quantity detector according to claim 4, wherein
the through hole is filled with a filler made of a metal or a resin.

8. The physical quantity detector according to claim 1, wherein
the sensor portion is provided in a channel that takes in some air.

* * * * *